US012598320B2

(12) United States Patent
Guetta et al.

(10) Patent No.: US 12,598,320 B2
(45) Date of Patent: Apr. 7, 2026

(54) INTER-EYE PREDICTION MODELS FOR XR

(71) Applicant: QUALCOMM Incorporated, San Diego, CA (US)

(72) Inventors: Matan Guetta, Kiryat Ono (IL); Peer Berger, Hod Hasharon (IL); Shay Landis, Hod Hasharon (IL); Amit Bar-Or Tillinger, Tel-Aviv (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 18/406,973

(22) Filed: Jan. 8, 2024

(65) Prior Publication Data

US 2025/0227279 A1     Jul. 10, 2025

(51) Int. Cl.
| | |
|---|---|
| *H04N 19/503* | (2014.01) |
| *H04N 5/265* | (2006.01) |
| *H04N 19/172* | (2014.01) |
| *H04N 19/597* | (2014.01) |
| *H04N 19/61* | (2014.01) |

(52) U.S. Cl.
CPC ........... *H04N 19/503* (2014.11); *H04N 5/265* (2013.01); *H04N 19/172* (2014.11); *H04N 19/597* (2014.11); *H04N 19/61* (2014.11)

(58) Field of Classification Search
CPC .... H04N 19/503; H04N 5/265; H04N 19/172; H04N 19/597; H04N 19/61

USPC ...................................................... 375/240.12
See application file for complete search history.

(56) References Cited

U.S. PATENT DOCUMENTS

| | | | |
|---|---|---|---|
| 7,860,180 | B2 | 12/2010 | Reznic et al. |
| 8,311,089 | B2 | 11/2012 | Ishikawa et al. |
| 11,824,653 | B2 | 11/2023 | Stoica et al. |
| 2010/0034260 | A1 | 2/2010 | Shimizu et al. |
| 2013/0335526 | A1 | 12/2013 | Lee et al. |
| 2017/0295356 | A1 | 10/2017 | Abbas et al. |
| 2024/0297732 | A1 | 9/2024 | Berger et al. |

OTHER PUBLICATIONS

Ganesan K., et al., "NR Sidelink Design Overview for Advanced V2X Service" IEEE Internet of Things Magazine, IEEE, vol. 3, No. 1, Apr. 13, 2020, Mar. 2020, pp. 26-30. XP011783153, the whole document.
International Search Report and Written Opinion—PCT/US2024/061721—ISA/EPO—Mar. 26, 2025.

*Primary Examiner* — Justin W Rider
(74) *Attorney, Agent, or Firm* — QUALCOMM Incorporated

(57) ABSTRACT

Method and apparatus for inter-eye prediction models for XR. The apparatus transforms at least part of a first frame associated with a first perspective of a first camera to at least part of a second frame associated with a second perspective of a second camera based on at least one prediction model. The apparatus transmits, to a second wireless device, a prediction indication of the at least one prediction model used to transform the at least part of the first frame to the at least part of the second frame. The apparatus transmits, to the second wireless device, an encoded signal comprising a combined frame comprising a combination of at least the first frame and the second frame.

30 Claims, 19 Drawing Sheets

400

450

600

610

Frame n (current)

Frame n-1

Frame n-2

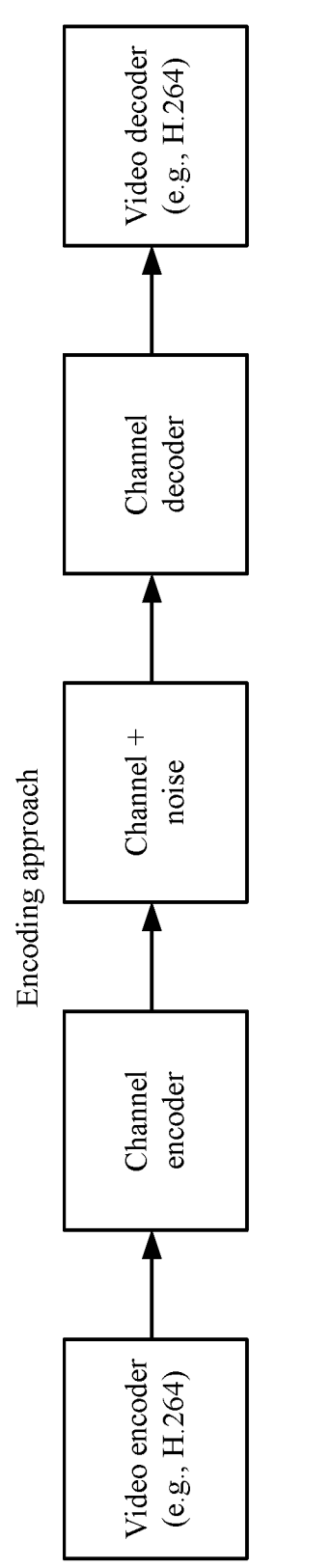
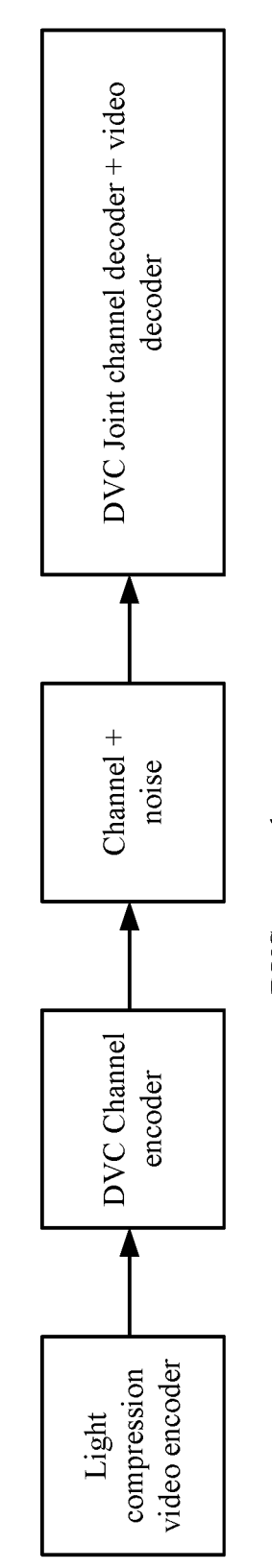
FIG. 8

900

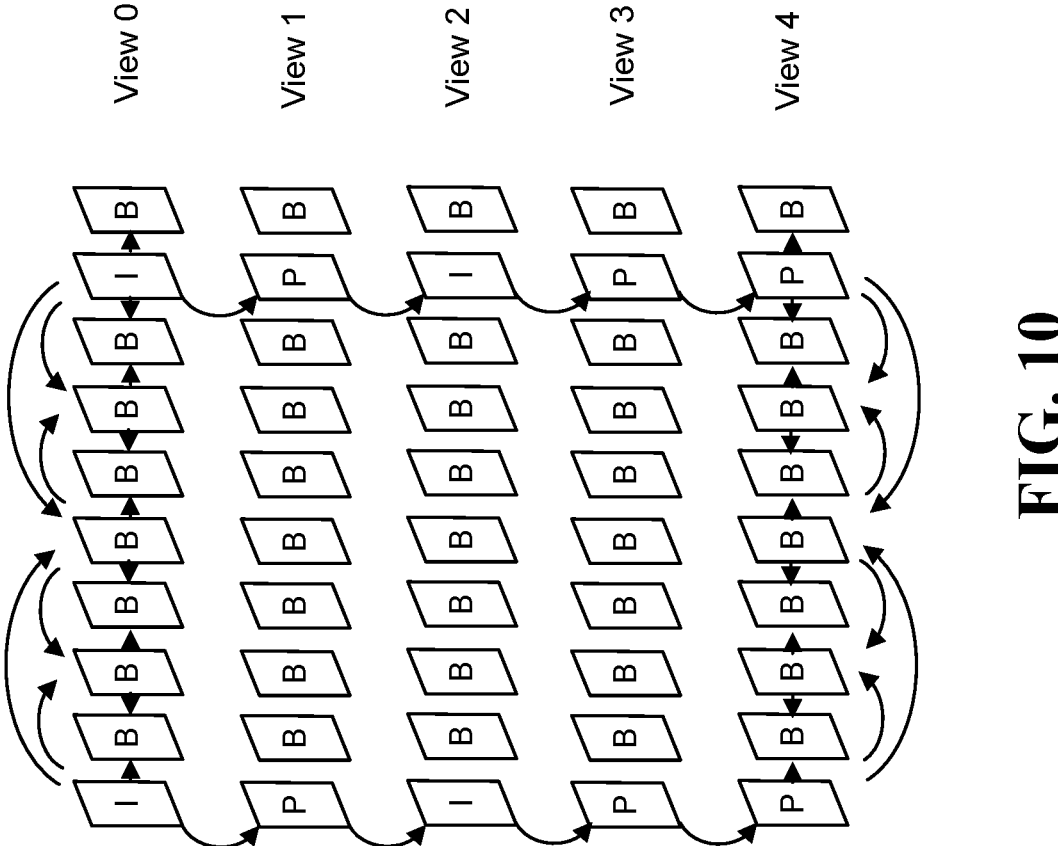
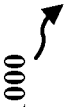
FIG. 10

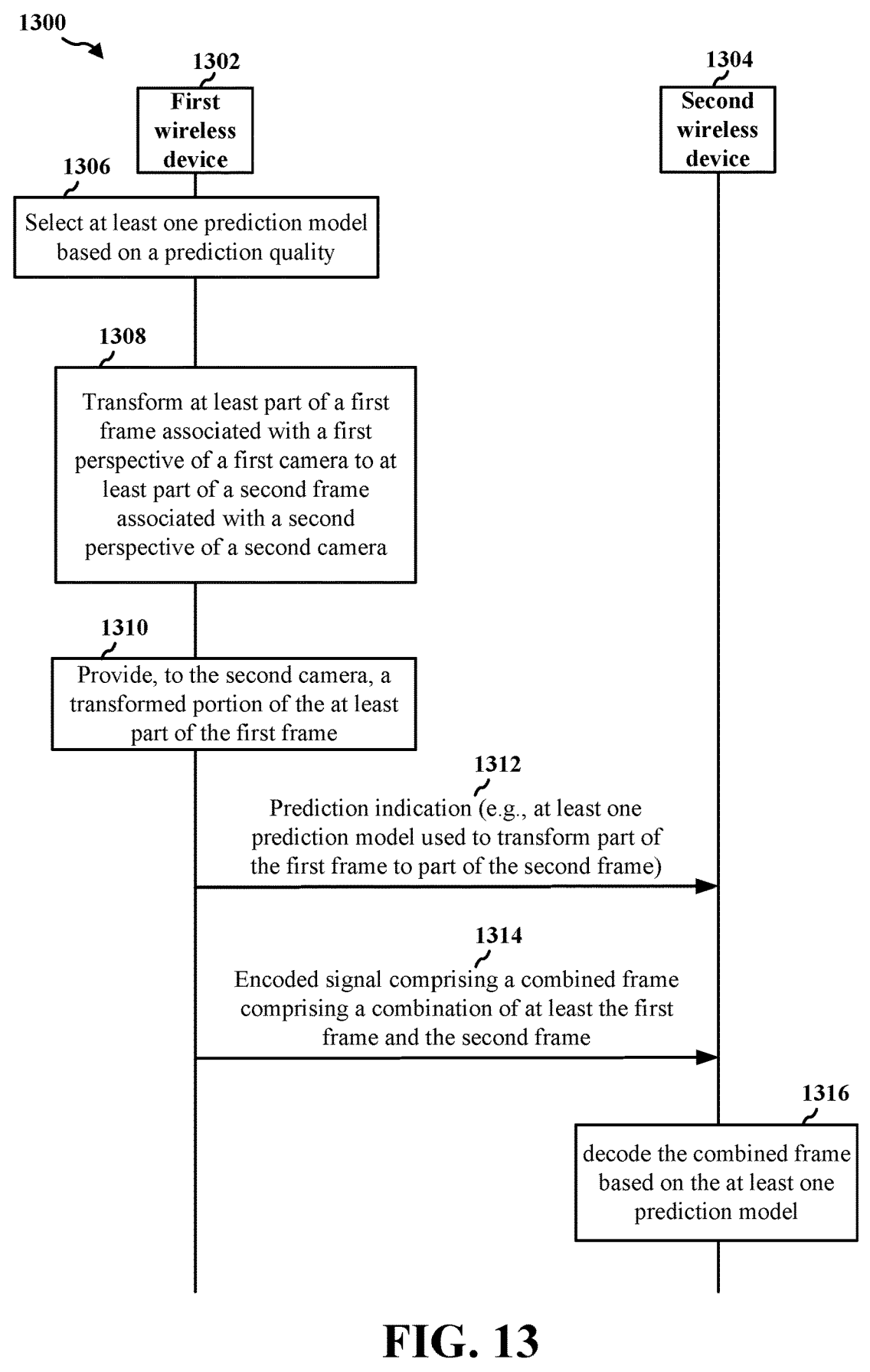

1300

1302

First
wireless
device

1304

Second
wireless
device

1306

Select at least one prediction model
based on a prediction quality

1308

Transform at least part of a first
frame associated with a first
perspective of a first camera to at
least part of a second frame
associated with a second
perspective of a second camera

1310

Provide, to the second camera, a
transformed portion of the at least
part of the first frame

1312

Prediction indication (e.g., at least one
prediction model used to transform part of
the first frame to part of the second frame)

1314

Encoded signal comprising a combined frame
comprising a combination of at least the first
frame and the second frame

1316 decode the combined frame
based on the at least one
prediction model

FIG. 13

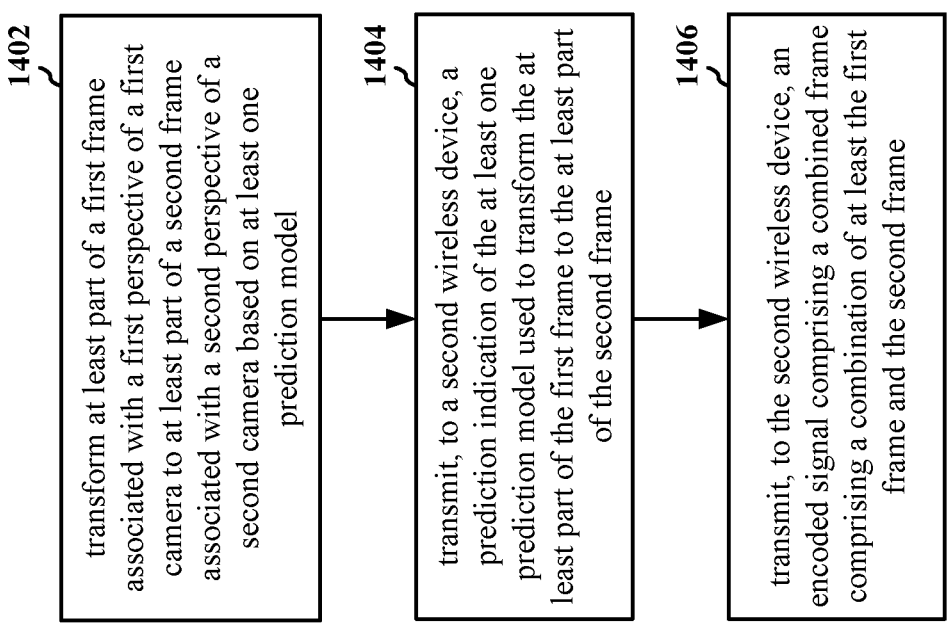

1402 transform at least part of a first frame associated with a first perspective of a first camera to at least part of a second frame associated with a second perspective of a second camera based on at least one prediction model

1404 transmit, to a second wireless device, a prediction indication of the at least one prediction model used to transform the at least part of the first frame to the at least part of the second frame

1406 transmit, to the second wireless device, an encoded signal comprising a combined frame comprising a combination of at least the first frame and the second frame

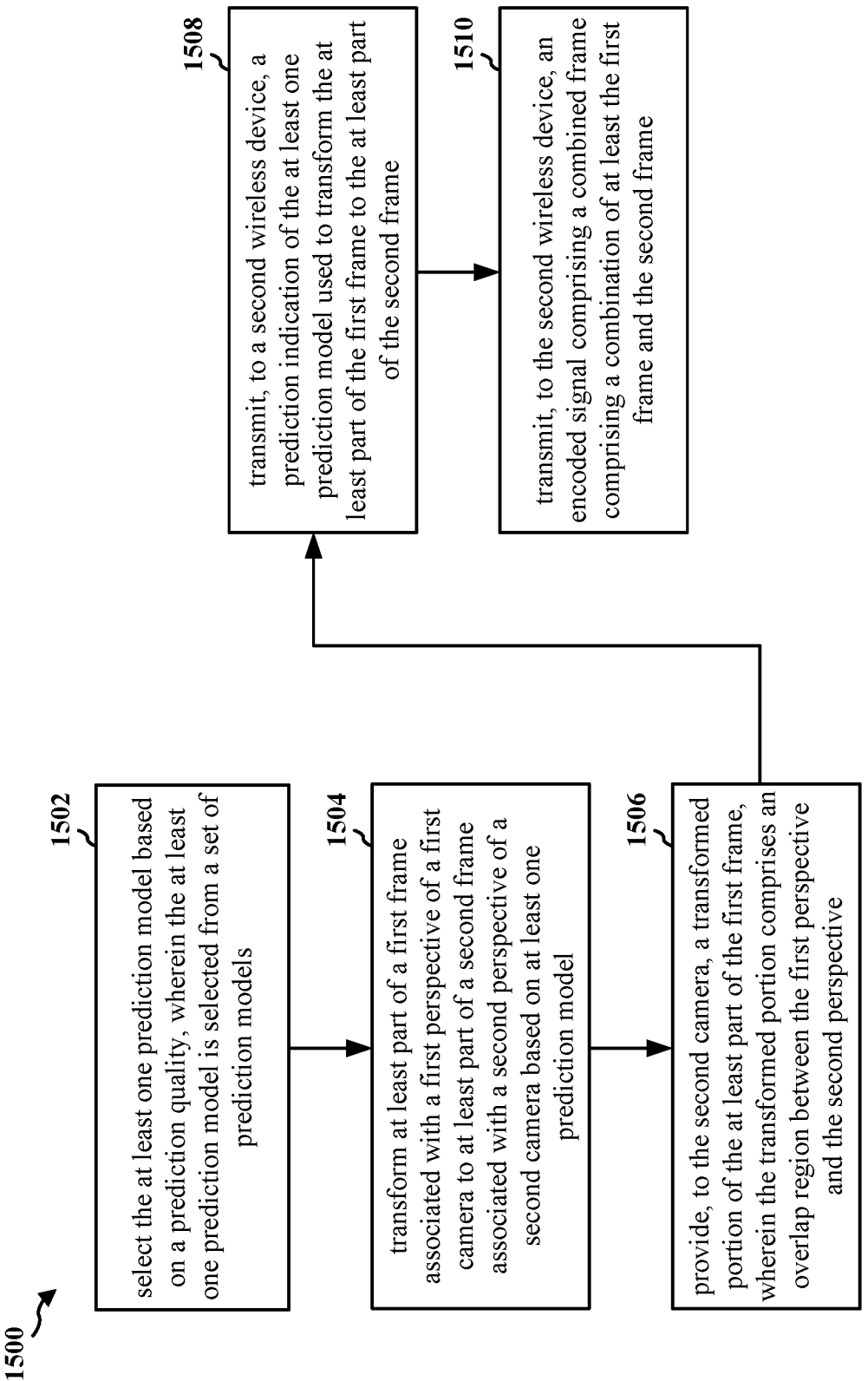

1500

1502 select the at least one prediction model based on a prediction quality, wherein the at least one prediction model is selected from a set of prediction models 1504 transform at least part of a first frame associated with a first perspective of a first camera to at least part of a second frame associated with a second perspective of a second camera based on at least one prediction model 1506 provide, to the second camera, a transformed portion of the at least part of the first frame, wherein the transformed portion comprises an overlap region between the first perspective and the second perspective 1508 transmit, to a second wireless device, a prediction indication of the at least one prediction model used to transform the at least part of the first frame to the at least part of the second frame 1510 transmit, to the second wireless device, an encoded signal comprising a combined frame comprising a combination of at least the first frame and the second frame

FIG. 15

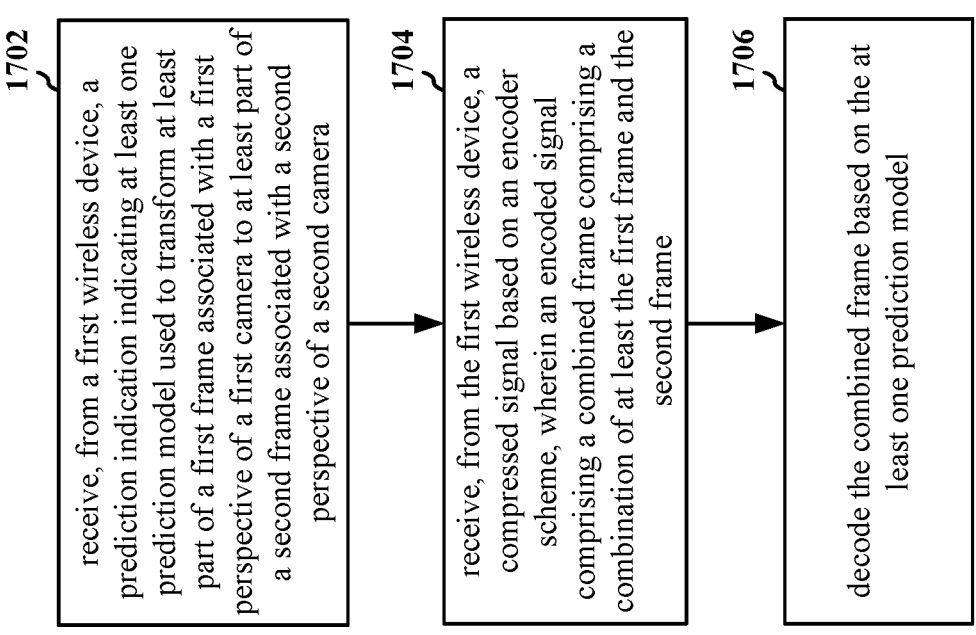

1702 receive, from a first wireless device, a prediction indication indicating at least one prediction model used to transform at least part of a first frame associated with a first perspective of a first camera to at least part of a second frame associated with a second perspective of a second camera

1704 receive, from the first wireless device, a compressed signal based on an encoder scheme, wherein an encoded signal comprising a combined frame comprising a combination of at least the first frame and the second frame

1706 decode the combined frame based on the at least one prediction model

FIG. 17

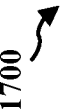

1700

104

1900

1902

1910
CU Processor(s) 1912
Prediction Component 199
Memory 1912'
Memory 1914
Communications Interface 1918

1930
DU Processor(s) 1932
Prediction Component 199
Memory 1932'
Memory 1934
Communications Interface 1938

Midhaul Link

Fronthaul Link

1940
Memory 1944
Transceiver(s) 1946
Antennas 1980
RU Processor(s) 1942
Prediction Component 199
Memory 1942'
Communications Interface 1948

INTER-EYE PREDICTION MODELS FOR XR

TECHNICAL FIELD

The present disclosure relates generally to communication systems, and more particularly, to a configuration for inter-eye prediction models for extended reality (XR).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transforms at least part of a first frame associated with a first perspective of a first camera to at least part of a second frame associated with a second perspective of a second camera based on at least one prediction model. The apparatus transmits, to a second wireless device, a prediction indication of the at least one prediction model used to transform the at least part of the first frame to the at least part of the second frame. The apparatus transmits, to the second wireless device, an encoded signal comprising a combined frame comprising a combination of at least the first frame and the second frame.

In an aspect of the disclosure, a method, a computer-readable medium, and an apparatus are provided. The apparatus may be a device at a network node. The device may be a processor and/or a modem at a network node or the network node itself. The apparatus receives, from a first wireless device, a prediction indication indicating at least one prediction model used to transform at least part of a first frame associated with a first perspective of a first camera to at least part of a second frame associated with a second perspective of a second camera. The apparatus receives, from the first wireless device, a compressed signal based on an encoder scheme, wherein an encoded signal comprising a combined frame comprising a combination of at least the first frame and the second frame. The apparatus decodes the combined frame based on the at least one prediction model.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a diagram of a distributed video coding scheme.

FIG. 10 is a diagram illustrating an example of multiview video coding.

FIG. 13 is a call flow diagram of signaling between a first wireless device and a second wireless device.

FIG. 14 is a flowchart of a method of wireless communication.

FIG. 15 is a flowchart of a method of wireless communication.

FIG. 17 is a flowchart of a method of wireless communication.

DETAILED DESCRIPTION

Figure 1:
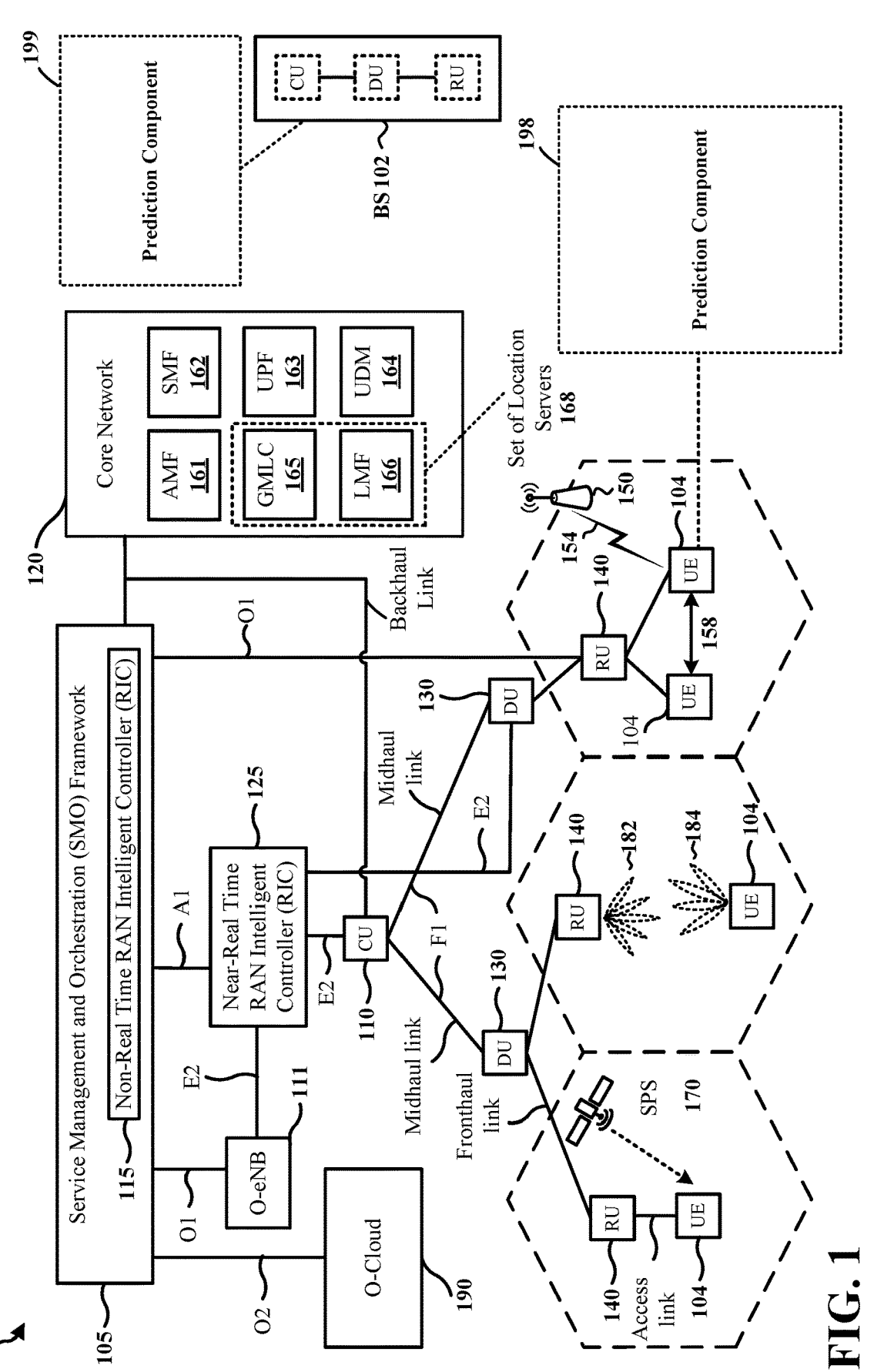
FIG. 1 is a diagram illustrating an example of a wireless communications system and an access network.

The popularity of virtual reality (VR), augmented reality (AR), and mixed reality (MR) technologies is growing at a fast pace and may be widely adopted for applications other than gaming. There is an increase demand for XR devices (e.g., XR goggles or headsets) having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

XR devices may comprise one or more sensors, as well as multiple cameras. In some instances, XR devices, such as XR glasses, goggles, or other headsets may include two cameras that may correspond or be aligned with each eye of a user. In instances where multiple cameras are used (e.g., multiview), there may be a correlation between the cameras, but an actual transform function in relation with the multiple cameras may not be present or available.

Aspects presented herein provide a configuration for inter-eye prediction models for XR. For example, prediction models for joint source channel encoding schemes between the multiple cameras may be utilized as the transform function. At least one advantage of the disclosure is that information related to a geometry and a direction of gaze of the multiple cameras may be utilized to obtain a coarse prediction between the eyes of the users. Yet another advantage of the disclosure may include an improvement of the compression based on geometry and direction of gaze, as well as a power reduction of the video encoder.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF)

166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a prediction component 198 that may be configured to transform at least part of a first frame associated with a first perspective of a first camera to at least part of a second frame associated with a second perspective of a second camera based on at least one prediction model; transmit, to a second wireless device, a prediction indication of the at least one prediction model used to transform the at least part of the first frame to the at least part of the second frame; and transmit, to the second wireless device, an encoded signal comprising a combined frame comprising a combination of at least the first frame and the second frame.

Referring again to FIG. 1, in certain aspects, the base station 102 or the UE 104 may comprise a prediction component 199 that may be configured to receive, from a first wireless device, a prediction indication indicating at least one prediction model used to transform at least part of a first frame associated with a first perspective of a first camera to at least part of a second frame associated with a second perspective of a second camera; receive, from the first wireless device, a compressed signal based on an encoder scheme, wherein an encoded signal comprising a combined frame comprising a combination of at least the first frame and the second frame; and decode the combined frame based on the at least one prediction model.

Although the following description may be focused on 5G NR, the concepts described herein may be applicable to other similar areas, such as LTE, LTE-A, CDMA, GSM, and other wireless technologies.

Figures 2A, 2B, 2C, 2D:
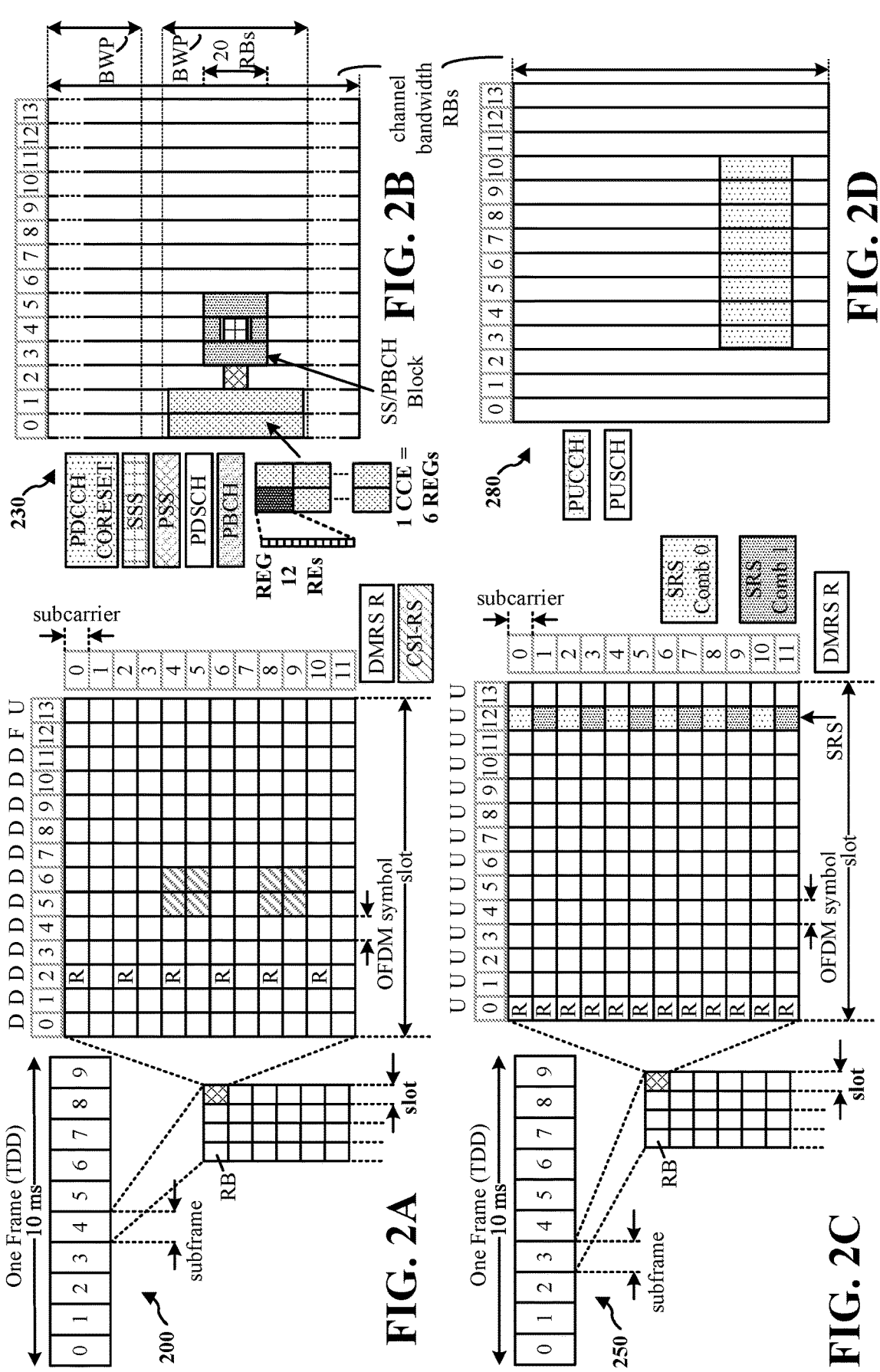
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15[kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS)

may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
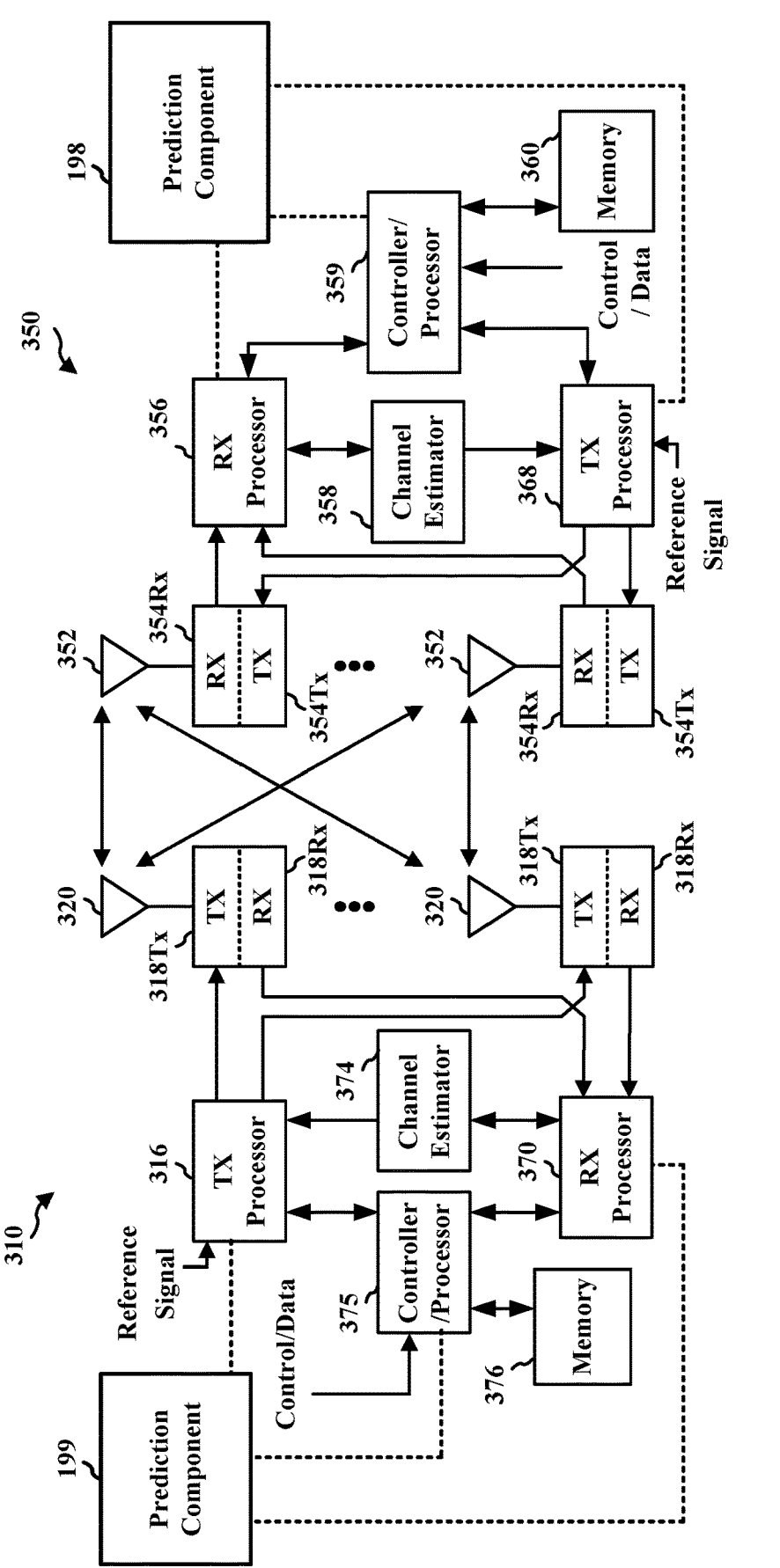
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the prediction component 198 of FIG. 1.

At least one of the TX processor 316, the RX processor 370, and the controller/processor 375 may be configured to perform aspects in connection with the prediction component 199 of FIG. 1.

XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

Figure 4B:
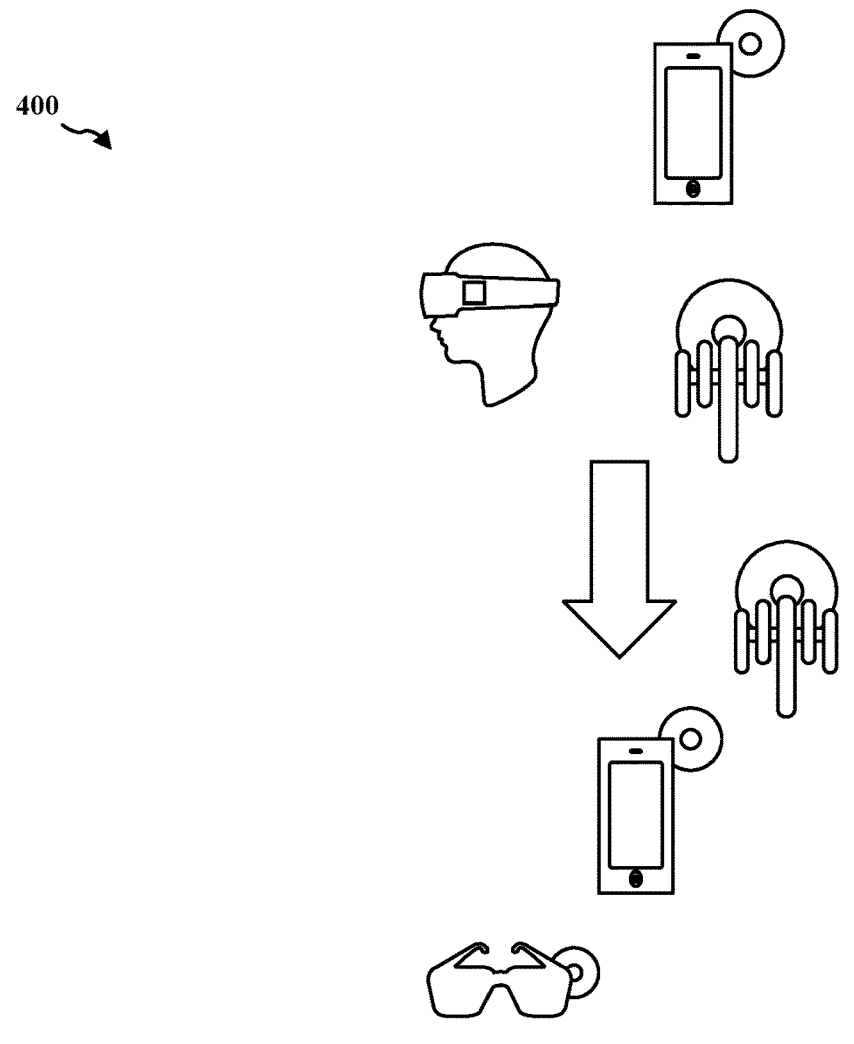
FIG. 4B is a diagram of wireless communications of XR devices.
Figure 4A:
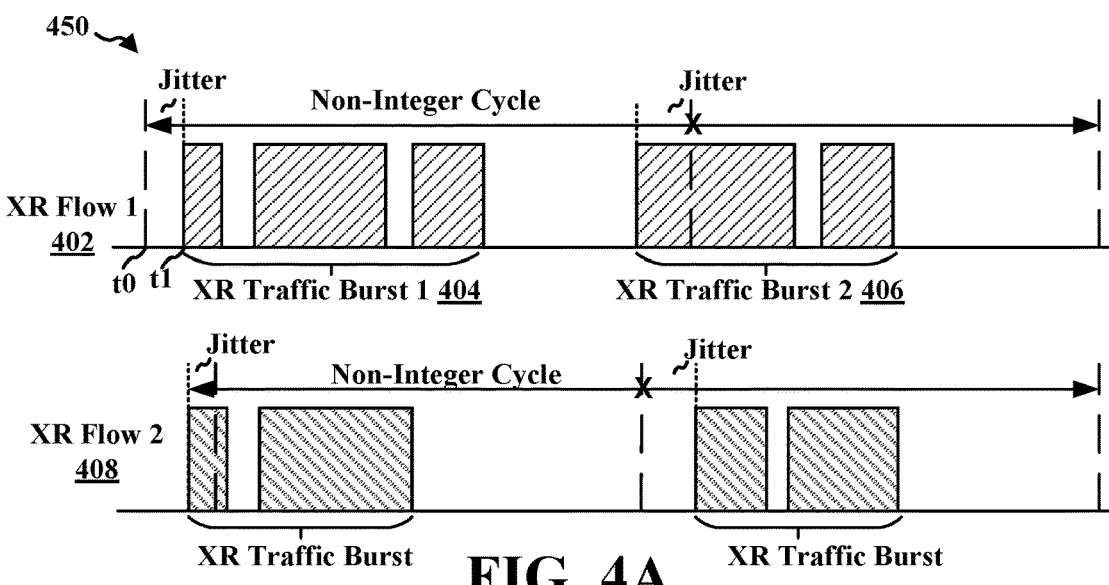
FIG. 4A is a diagram illustrating aspects of XR communication.

XR traffic may arrive in periodic traffic bursts ("XR traffic bursts"). An XR traffic burst may vary in a number of packets per burst and/or a size of each pack in the burst. FIG. 4A includes a diagram 450 illustrating a first XR flow 402 that includes a first XR traffic burst 404 and a second XR traffic burst 406. As illustrated in the diagram 450, the traffic bursts may include different numbers of packets, e.g., the first XR traffic burst 404 being shown with three packets (represented as rectangles in the diagram 450) and the second XR traffic burst 406 being shown with two packets. Furthermore, as illustrated in the diagram 450, the three packets in the first XR traffic burst 404 and the two packets in the second XR traffic burst 406 may vary in size, that is, packets within the first XR traffic burst 404 and the second XR traffic burst 406 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in $\frac{1}{60}$=16.67 ms periods. In another example, for 120 FPS video data, XR traffic bursts may arrive in $\frac{1}{120}$=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a base station) concurrently with one another (or within a threshold period of time). For instance, the diagram 450 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

The popularity of VR, AR, and MR technologies is growing at a fast pace and may be widely adopted for applications other than gaming, such as but not limited to healthcare, education, social, retail, and many more. There is an increase demand for XR devices (e.g., XR goggles or headsets), as shown for example in diagram 400 of FIG. 4B, having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

Video encoders, such as H.264, H.265, or the like, operate on the basis of breaking each frame of a video (e.g., image) into sub-regions and then for each sub-region, the encoder may try several hypotheses (e.g., predictions) and the encoder may select the best or optimal hypothesis based on video quality and compression. The hypotheses may perform predictions in various formats. For example, some predictions may be based on adjacent pixels, temporal predictions based on images in time, and the like.

Figures 5A, 5B:
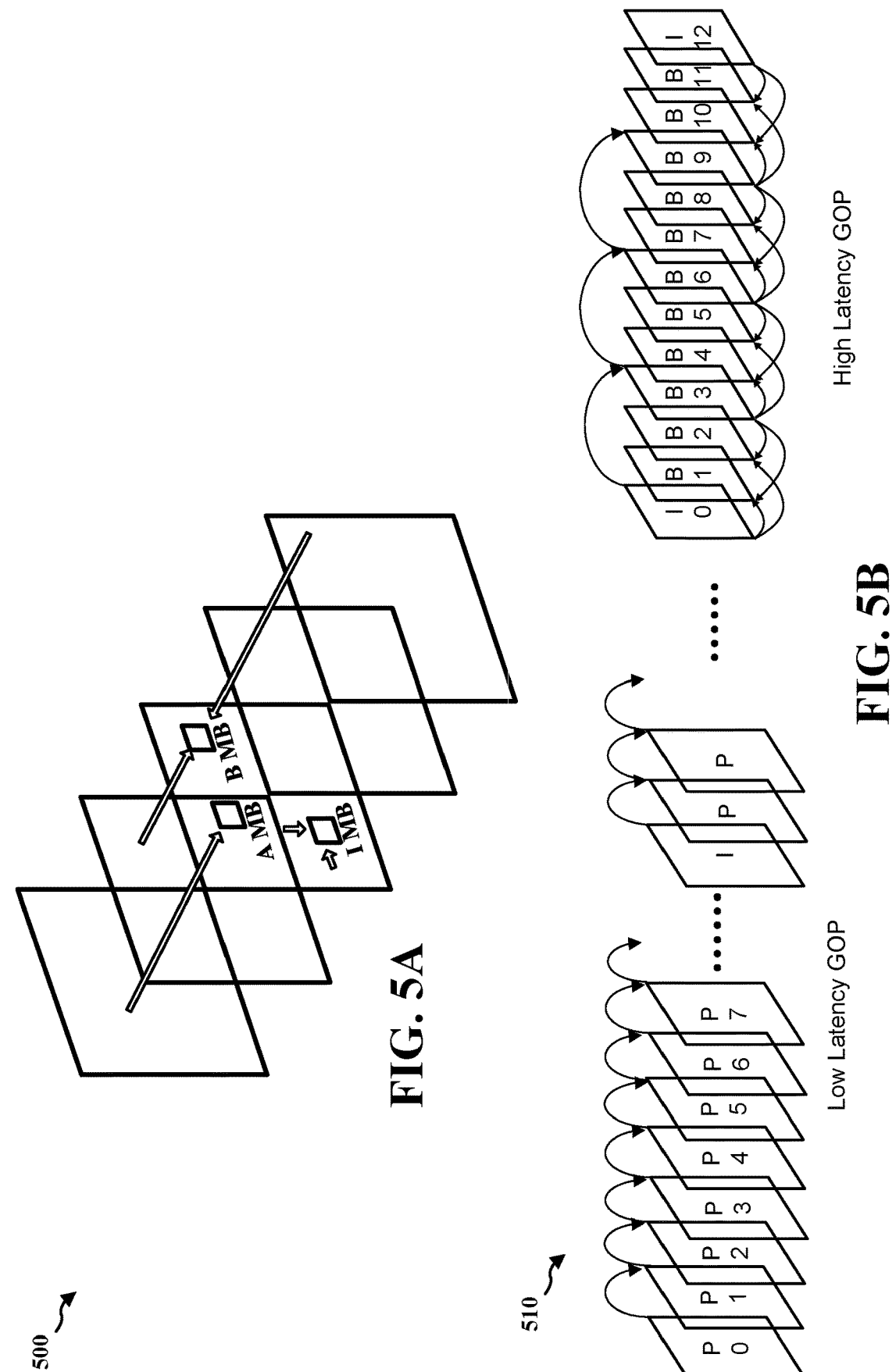
FIGS. 5A-5B is a diagram illustrating an example of a prediction scheme.

FIGS. 5A and 5B provide an example of a macroblock prediction. Macroblock (MB) prediction may include three types of predictions, as shown in diagram 500 of FIG. 5A. For example, an I MB prediction is a prediction based on intra-prediction from neighboring samples in a current frame. A P MB prediction is a prediction based on samples in a previously-coded frame. A B MB prediction is a prediction based on samples in a previously-coded frame and from following frames. An order in which the I, P, and B frames are arranged may be known as a group of pictures (GOP), as shown for example in diagram 510 of FIG. 5B.

Figures 6A, 6B:
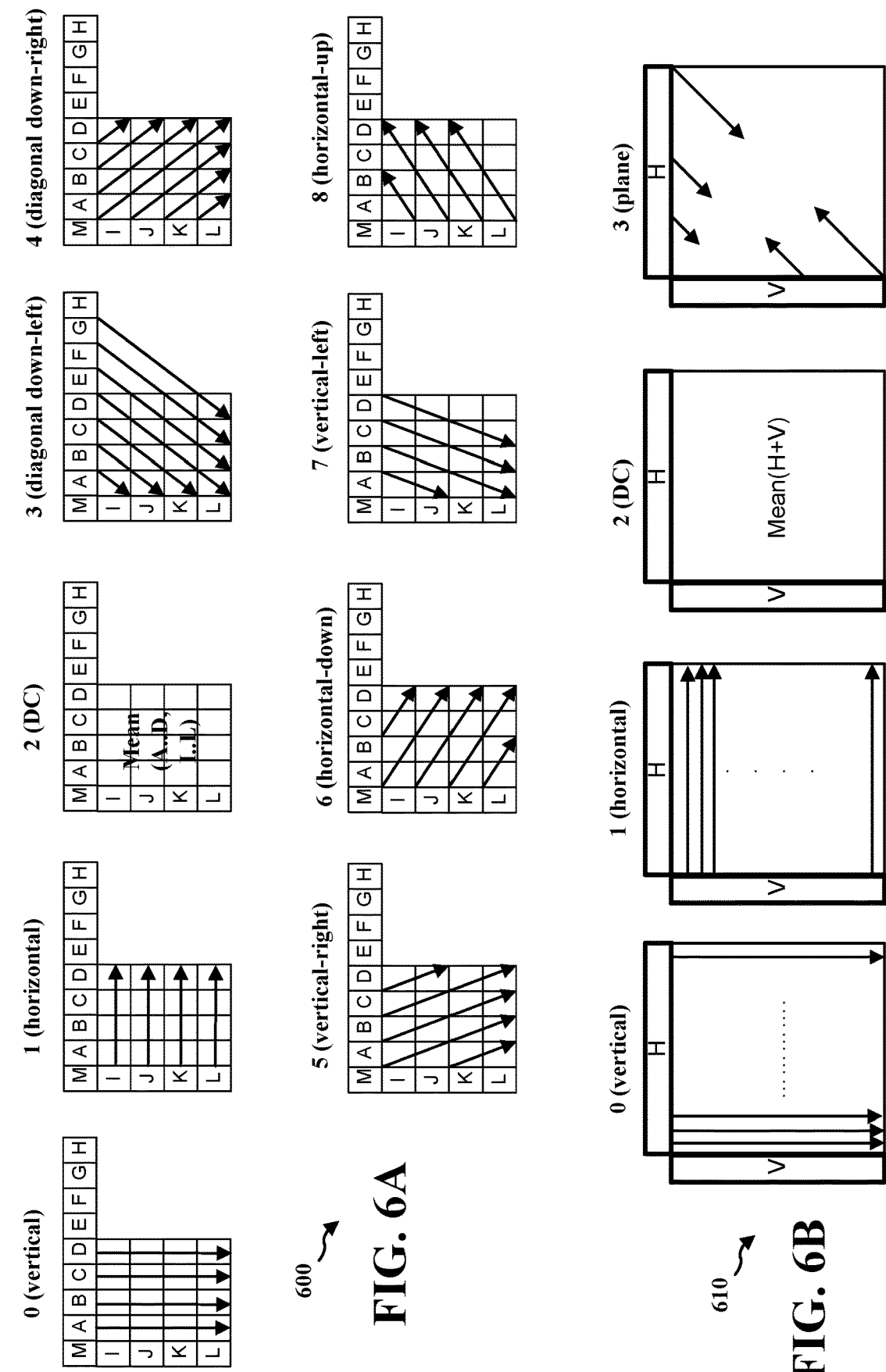
FIGS. 6A-6B is a diagram illustrating an example of a prediction scheme.

FIGS. 6A and 6B provide an example of an intra (e.g., spatial) prediction. Intra predictions may use different block sizes (e.g., 16×16, 8×8, 4×4) to predict a macroblock from the surrounding previously-coded pixels within the same frame. For a typical block of luma or chroma samples, there may be a correlation between samples in the block and samples that are immediately adjacent to the block, as shown for example in diagram 600 of FIG. 6A or diagram 610 of FIG. 6B. The examples shown in diagram 600 of FIG. 6A include examples of 4×4 intra prediction modes, while the examples shown in diagram 610 of FIG. 6B include examples of 16×16 prediction modes.

Figure 7:
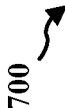
FIG. 7 is a diagram illustrating an example of a prediction scheme.

FIG. 7 provides a diagram 700 of inter (e.g., temporal) prediction. Inter prediction is a process of predicting a block of luma and chroma samples from an image that has previously been coded and transmitted (e.g., a reference image). Inter prediction may comprise selection of a prediction region (e.g., search space), generation of a prediction block, subtraction of the prediction block from the original block of samples to form a residual, and coding and transmission of the residual block. The reference image may be selected from a list of previously coded images, stored in a decoded picture buffer, which may include images before and after the current image in display order. An offset between the position of the current partition and the prediction region in the reference image may be known as a motion vector. In some instances, the offset between two macroblocks and the motion vector may have a ¼ pixel resolution for the luma component and a ⅛ pixel resolution for the chroma component. The luma (Y) and chroma (Cr, Cb) samples at sub-pixel positions do not exist in the reference image(s) and are created using interpolation from nearby image samples.

These predictions are tried in the encoder and the encoder selects the best prediction and then prepares two components that include information related to the prediction. For example, the first indication includes the prediction, and the second indication includes the difference between the prediction and the actual image.

In some instances, such as in distributed video coding (DVC), the video encoder may be a complex component for an XR device, such that the video encoder has a high power consumption, or may introduce latency such that there is a tradeoff between compression ratio and latency. In DVC, the complexity of the video encoding may be performed by the video decoder. For example, video decoding may be performed at a receiver. With reference to diagram 800 of FIG. 8, a conventional approach may include a transmitter encoding a video at a video encoder, a channel encoding at a channel encoder, transmission of the encoded channel plus noise, decoding of the channel at a channel decoder of a receiver, and then decoding of the encoded channel at a video decoder at the receiver. In a DVC approach, a transmitter may perform light compression at a video encoder, a DVC channel encoding at a DVC channel encoder, transmission of the encoded channel plus noise to the receiver where joint communication and video decoding is performed at a DVC joint channel decoder and video decoder of the receiver.

Figure 9:
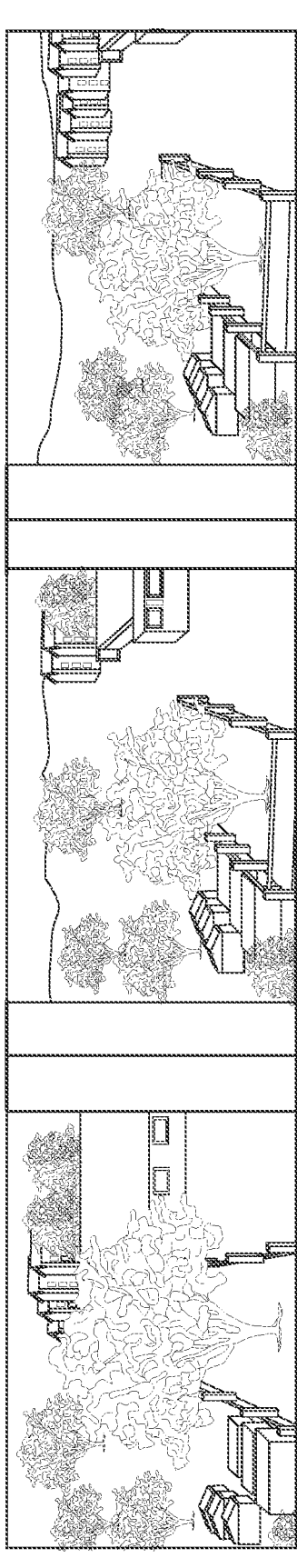
FIG. 9 is a diagram illustrating an example of multiview video.

In some instances, such as in multiview video coding (MVC), multiview video may include video data that incorporates multiple concurrent versions of a particular scene, as shown for example in diagram 900 of FIG. 9. The inherent redundancies in a multiview scene may be exploited by introducing predictions between views, i.e., inter-view prediction structures. For example, with reference to diagram 1000 of FIG. 10, a View 0 (top) may be predicted using a hierarchical GOP structure using conventional tools (e.g., H.264). View 0 can be decoded by an advanced video coding (AVC) or MVC decoder and may be considered as a base layer or a base view. Each of the other views uses a similar prediction structure, except that the key pictures are now P slices (e.g., based on the current and a previous frame), predicted from an I slice (e.g., intra prediction based on the current frame) or P slice in the previous view, where the B slice is a prediction from a previous and a future frame.

Some options for XR compression may involve joint source-channel encoding at the physical (PHY) layer. DVC may be utilized due in part to transferring the video encoder complexity to the receiver using the PHY layer. Another joint source channel scheme may comprise unequal error protection (UEP) polar code scheme. Yet another joint source channel scheme may comprise Slepian-Wolf based solutions. An advantage of joint source channel schemes may include power reduction at the XR device and/or a reduction in latency.

XR devices may comprise one or more sensors, as well as multiple cameras. In some instances, XR devices, such as XR glasses, goggles, or other headsets may include two cameras that may correspond or be aligned with each eye of a user. In instances where multiple cameras are used (e.g., multiview), there may be a correlation between the cameras, but an actual transform function in relation with the multiple cameras may not be present or available. In such instances, a zero-order hold may be utilized.

Aspects presented herein provide a configuration for inter-eye prediction models for XR. For example, prediction models for joint source channel encoding schemes between the multiple cameras may be utilized as the transform function. In addition, an XR device may transmit an indication related to the prediction model utilized to a receiver such that the XR device and the receiver may be synchronized with regards to the prediction model used. At least one advantage of the disclosure is that information related to a geometry and a direction of gaze of the multiple cameras may be utilized to obtain a coarse prediction between the eyes of the users. Yet another advantage of the disclosure may include an improvement of the compression based on geometry and direction of gaze, as well as a power reduction of the video encoder.

In some aspects, prediction models may be configured to predict data between two eyes or cameras associated with each eye of the user may be based on XR geometry and direction of gaze of the cameras. A transmitter (e.g., XR device), instead of working on finding the best prediction which is a complex and power intensive function of the video encoder, may use one or more prediction models from a plurality of prediction modes as a prediction for the second eye (e.g., camera). The transmitter may determine to use this prediction on the fly based on whether a prediction calculation (e.g., sum absolute error) exceeds a threshold or not. The prediction calculation exceeding the threshold may indicate that such prediction is not accurate, such that the transmitter may select another prediction model to use and may calculate the corresponding prediction calculation. The receiver should be informed of the prediction model used by the transmitter (e.g., XR device). As such, the transmitter may provide a prediction model indication to the receiver. In some aspects, the prediction model indication may be provided to the receiver as a pre-configuration indication at a handshake between the transmitter and the receiver. In some aspects, the prediction model indication may be provided to the receiver as control information which may support dynamic decisions based on prediction performance. In some aspects, the prediction model indication may be provided to the receiver in a periodic or aperiodic configuration. The prediction model indication may be sent via DCI, RRC, or MAC-CE, which may reduce the latency of the message. For example, using DCI, RRC, or MAC-CE to indicate the prediction model may reduce the latency of the message in comparison to conventional video compression (e.g., H.264 or the like).

Figure 11:
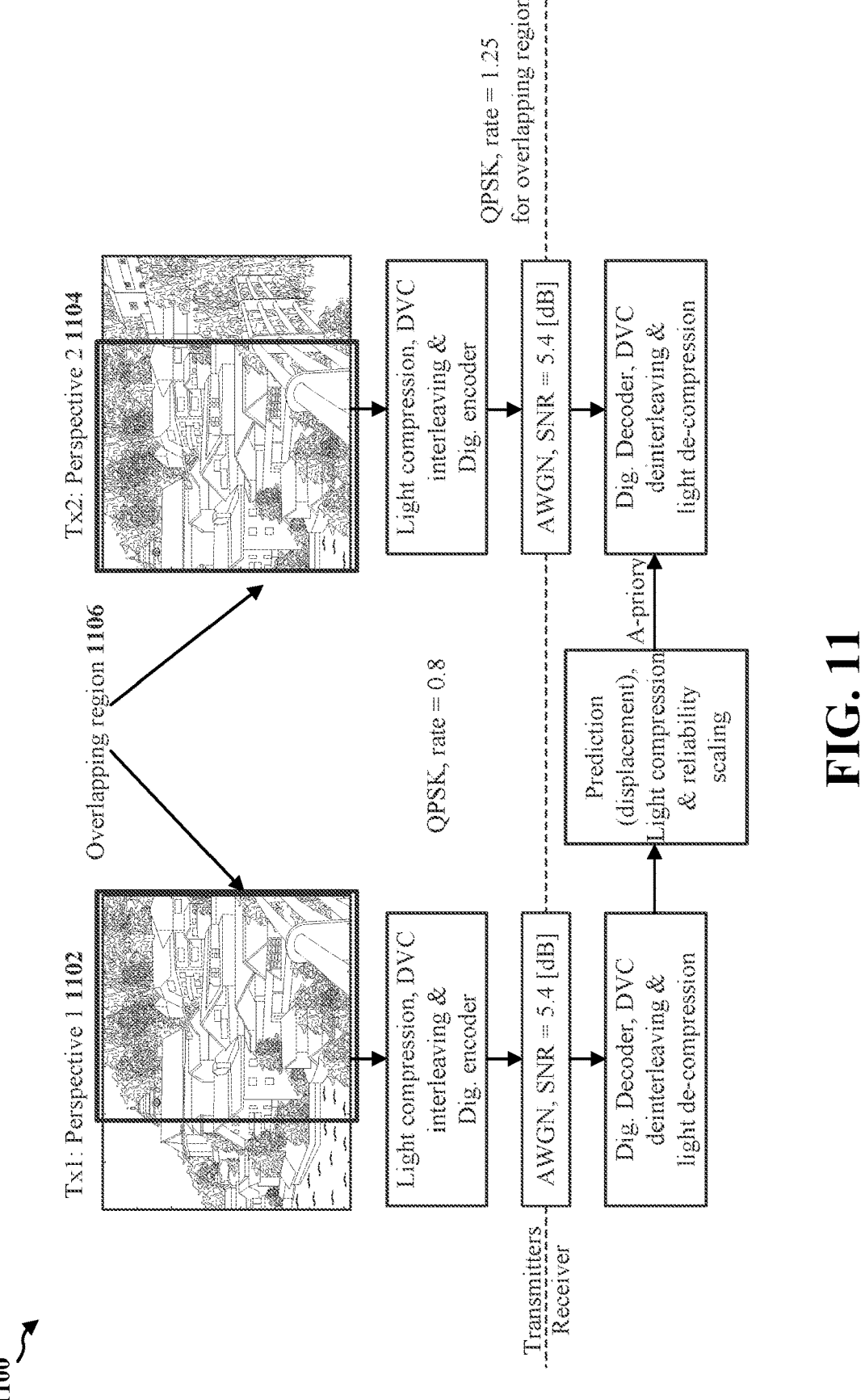
FIG. 11 is a diagram illustrating an example of a geometric mode utilized in a DVC scheme.

FIG. 11 provides a diagram 1100 of an example of a geometric model between two cameras may be utilized in a DVC scheme. For example, a first transmitter Tx1 may be associated with a first perspective 1102 of a first camera, while a second transmitter Tx2 may be associated with a second perspective 1104 of a second camera. At least a portion of the first perspective and the second perspective overlap, such that an overlapping region 1106 is present between the first perspective and the second perspective. The first camera may perform a prediction on the overlapping region of the first perspective, the second camera receives an indication of the prediction decision from the first camera and uses the prediction decision to generation the overlapping region within the second perspective 1104 to generate a frame associated with the second perspective 1104. The first and second transmitter may transmit their respective frame to the receiver which may utilize DVC to generate a combined frame based on the first perspective and the second perspective.

In some aspects, such as a simple overlap model, an overlap region may be defined using two-dimensional coordinates (e.g., upper left corner and bottom right corner). The transmitter may provide an indication related to the overlap region to the receiver. The transmitter may determine to use a prediction on the fly or dynamically based on a prediction calculation. The prediction type (e.g., whether to use a geometry model-based prediction or inter, intra, etc.) may be signaled to the receiver. For example, a 1-bit may be utilized to indicate usage of the geometry-based model prediction for an entire frame (e.g., 1 may indicate using a geometry model for the prediction). In some aspects, if the simple overlap model is utilized, the transmitter may provide the corresponding parameters to the receiver. In such instances, the corresponding parameters may be transmitted to the receiver via DCI or MAC-CE, such that a few bits are utilized for the transmission of the parameters. For example, the parameters may be transmitted periodically, where the periodicity may be pre-defined at connection configuration. In another example, the parameters may be transmitted aperiodically, where the transmitter updates the model parameters based at least on a direction of gaze.

Figure 12:
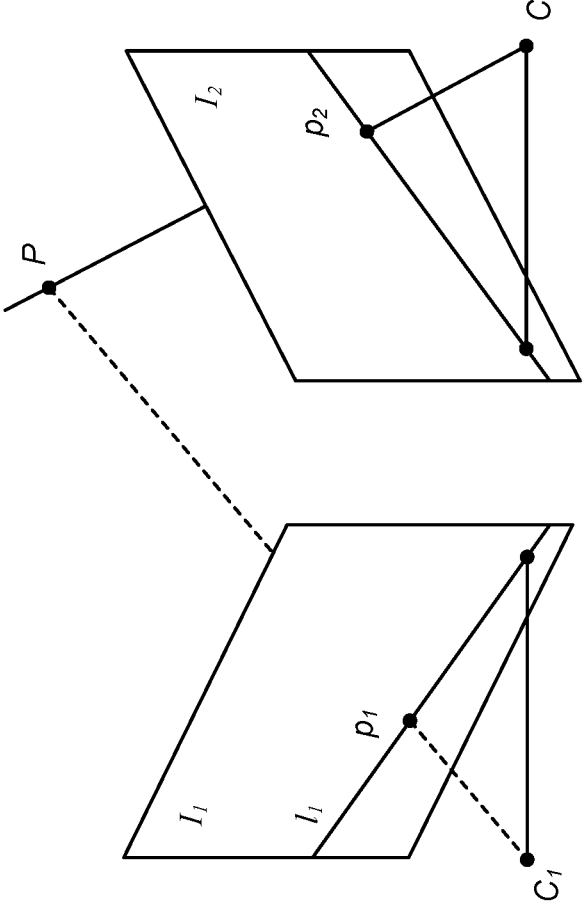
FIG. 12 is a diagram illustrating an example of epipolar geometry.

FIG. 12 provides a diagram 1200 of an example of epipolar geometry utilized for a geometry model. For example, the epipolar model may be based on $$\tilde{P}_1^T \cdot F \cdot \tilde{P}_2 = \tilde{P}_1^T \cdot l_1 = 0$$

where $\tilde{P}_1^T$ and $\tilde{P}_2$ are the homogenous coordinates of $P_1$ and $P_2$, and F is a 3×3 matrix called the fundamental matrix (FM). Once the FM is available, the equation of epipolar line $l_1$ may be computed. There may be multiple ways to determine the FM. For example, if the cameras are calibrated, the FM may be calculated from the camera projection matrices.

In this model, at least two parameters may be signaled (e.g., via RRC), F corresponding to a fundamental matrix and C1, C2 which correspond to three-dimensional locations of the camera. The fundamental matrix may be an algebraic representation of the epipolar geometry. For example, F may comprise a 3×3 matrix, such that 9 parameters may be signaled based on the 3×3 matrix. However, F may comprise a matrix of many different sizes and is not intended to be limited to a 3×3 matrix. In some aspects, an index number that corresponds to the fundamental matrix based on a pre-defined set may be provided. The three-dimensional locations of the cameras (e.g., camera1, camera2) may comprise six parameters being signaled, where each camera has three parameters that represent the three-dimensional location of each camera. In some aspects, an index number that corresponds to the three-dimensional locations of the cameras based on a pre-defined set may be provided.

The transmitter may decide whether to use this prediction on a dynamic basis based on a prediction calculation. The prediction type (e.g., whether a geometry model-based prediction or inter, intra, etc. is utilized) may be signaled. In some aspects, 1 bit may be utilized to indicate usage of the geometry-based model prediction for the entire frame, where a value of '1' indicates that a geometry model for the prediction is utilized. In some aspects, 1 bit may be utilized to indicate usage of the geometry-based model prediction for super-block, macro-block, or any other predefined partition, where a value of '1' indicates that a geometry model for the prediction is utilized.

FIG. 13 is a call flow diagram 1300 of signaling between a first wireless device 1302 and a second wireless device 1304. The first wireless device 1302 may be configured to communicate with the second wireless device 1304. For example, in the context of FIG. 1, the second wireless device 1304 may correspond to base station 102 or the UE 104 and the first wireless device 1302 may correspond to at least UE 104. In another example, in the context of FIG. 3, the second wireless device 1304 may correspond to base station 310 and the first wireless device 1302 may correspond to UE 350. In some aspects, the first wireless device 1302 may comprise an XR device (e.g., goggles, headset) or a UE, where the second wireless device may comprise a UE or a base station, such that the XR device (e.g., first wireless device) may communicate with the UE/base station (e.g., second wireless device).

At 1306, the first wireless device 1302 may select at least one prediction model based on a prediction quality. The at least one prediction model may be selected from a set of prediction models.

At 1308, the first wireless device 1302 may transform at least part of a first frame associated with a first perspective of a first camera to at least part of a second frame associated with a second perspective of a second camera based on at least one prediction model. The first camera and the second camera may be associated with or comprised by the first wireless device 1302. In some aspects, the at least one prediction model may predict the at least part of the second frame based on the at least part of the first frame.

At 1310, the first wireless device 1302 may provide a transformed portion of the at least one frame to the second camera. The transformed portion of the at least one frame may comprise an overlap region between the first perspective and the second perspective. In some aspects, the transformed portion may be transformed based on the at least one prediction model. The second perspective may comprise the transformed portion and at least a second region that extends beyond the first perspective. The first perspective may comprise a first region that extends beyond the overlap region and the second perspective.

At 1312, the first wireless device 1302 may transmit, to a second wireless device 1304, a prediction indication. The second wireless device 1304 may receive the prediction indication from the first wireless device 1302. The prediction indication may correspond to the at least one prediction model used to transform the at least part of the first frame to the at least part of the second frame. In some aspects, the prediction indication may comprise one or more parameters associated with the at least one prediction model. In some aspects, the prediction indication may be transmitted when a connection between the first wireless device and the second wireless device is established. In some aspects, the prediction indication may be transmitted within at least one of a downlink control indicator (DCI), radio resource control (RRC) signaling, or media access control (MAC) control element (CE) (MAC-CE). In some aspects, the prediction indication may be transmitted in a periodic configuration or an aperiodic configuration.

At 1314, the first wireless device 1302 may transmit, to the second wireless device 1304, an encoded signal. The second wireless device 1304 may receive the encoded signal from the first wireless device 1302. The encoded signal may comprise a combined frame comprising a combination of at least the first frame and the second frame.

At 1316, the second wireless device 1304 may decode the combined frame. The second wireless device may decode the combined frame based on the at least one prediction model.

FIG. 14 is a flowchart 1400 of a method of wireless communication at a first wireless device. The method may be performed by a UE (e.g., the UE 104; the apparatus 1604). One or more of the illustrated operations may be omitted, transposed, or contemporaneous. The method may allow a first wireless device (e.g., transmitter) to indicate a prediction model used such that the first wireless device and a second wireless device (e.g., receiver) are synchronized in relation to the geometry model used.

At 1402, the first wireless device may transform at least part of a first frame associated with a first perspective of a first camera. For example, 1402 may be performed by prediction component 198 of apparatus 1604. The first wireless device may transform at least part of the first frame associated with the first perspective of the first camera to at least part of a second frame associated with a second perspective of a second camera based on at least one prediction model. In some aspects, the at least one prediction model may predict the at least part of the second frame based on the at least part of the first frame.

At 1404, the first wireless device may transmit, to a second wireless device, a prediction indication. For example, 1404 may be performed by prediction component 198 of apparatus 1604. The prediction indication may correspond to the at least one prediction model used to transform the at least part of the first frame to the at least part of the second frame. In some aspects, the prediction indication may comprise one or more parameters associated with the at least one prediction model. In some aspects, the prediction indication may be transmitted when a connection between the first wireless device and the second wireless device is established. In some aspects, the prediction indication may be transmitted within at least one of a downlink control indicator (DCI), radio resource control (RRC) signaling, or media access control (MAC) control element (CE) (MAC-CE). In some aspects, the prediction indication may be transmitted in a periodic configuration or an aperiodic configuration.

At 1406, the first wireless device may transmit, to the second wireless device, an encoded signal. For example, 1406 may be performed by prediction component 198 of apparatus 1604. The encoded signal may comprise a combined frame comprising a combination of at least the first frame and the second frame.

FIG. 15 is a flowchart 1500 of a method of wireless communication at a first wireless device. The method may be performed by a UE (e.g., the UE 104; the apparatus 1604). One or more of the illustrated operations may be omitted, transposed, or contemporaneous. The method may allow a first wireless device to indicate a prediction model used such that the first wireless device and a second wireless device are synchronized in relation to the geometry model used.

At 1502, the first wireless device may select at least one prediction model. For example, 1502 may be performed by prediction component 198 of apparatus 1604. The first wireless device may select the at least one prediction model based on a prediction quality. The at least one prediction model may be selected from a set of prediction models.

At 1504, the first wireless device may transform at least part of a first frame associated with a first perspective of a first camera. For example, 1504 may be performed by prediction component 198 of apparatus 1604. The first wireless device may transform at least part of the first frame associated with the first perspective of the first camera to at least part of a second frame associated with a second perspective of a second camera based on at least one prediction model. In some aspects, the at least one prediction model may predict the at least part of the second frame based on the at least part of the first frame.

At 1506, the first wireless device may provide a transformed portion of the at least one frame. For example, 1506 may be performed by prediction component 198 of apparatus 1604. The first wireless device may provide the transformed portion of the at least one frame to the second camera. The transformed portion may comprise an overlap region between the first perspective and the second perspective. In some aspects, the transformed portion may be transformed based on the at least one prediction model. The second perspective may comprise the transformed portion and at least a second region that extends beyond the first perspective. The first perspective may comprise a first region that extends beyond the overlap region and the second perspective.

At 1508, the first wireless device may transmit, to a second wireless device, a prediction indication. For example, 1508 may be performed by prediction component 198 of apparatus 1604. The prediction indication may correspond to the at least one prediction model used to transform the at least part of the first frame to the at least part of the second frame. In some aspects, the prediction indication may comprise one or more parameters associated with the at least one prediction model. In some aspects, the prediction indication may be transmitted when a connection between the first wireless device and the second wireless device is established. In some aspects, the prediction indication may be transmitted within at least one of DCI, RRC signaling, or MAC-CE. In some aspects, the prediction indication may be transmitted in a periodic configuration or an aperiodic configuration.

At 1510, the first wireless device may transmit, to the second wireless device, an encoded signal. For example, 1510 may be performed by prediction component 198 of apparatus 1604. The encoded signal may comprise a combined frame comprising a combination of at least the first frame and the second frame.

Figure 16:
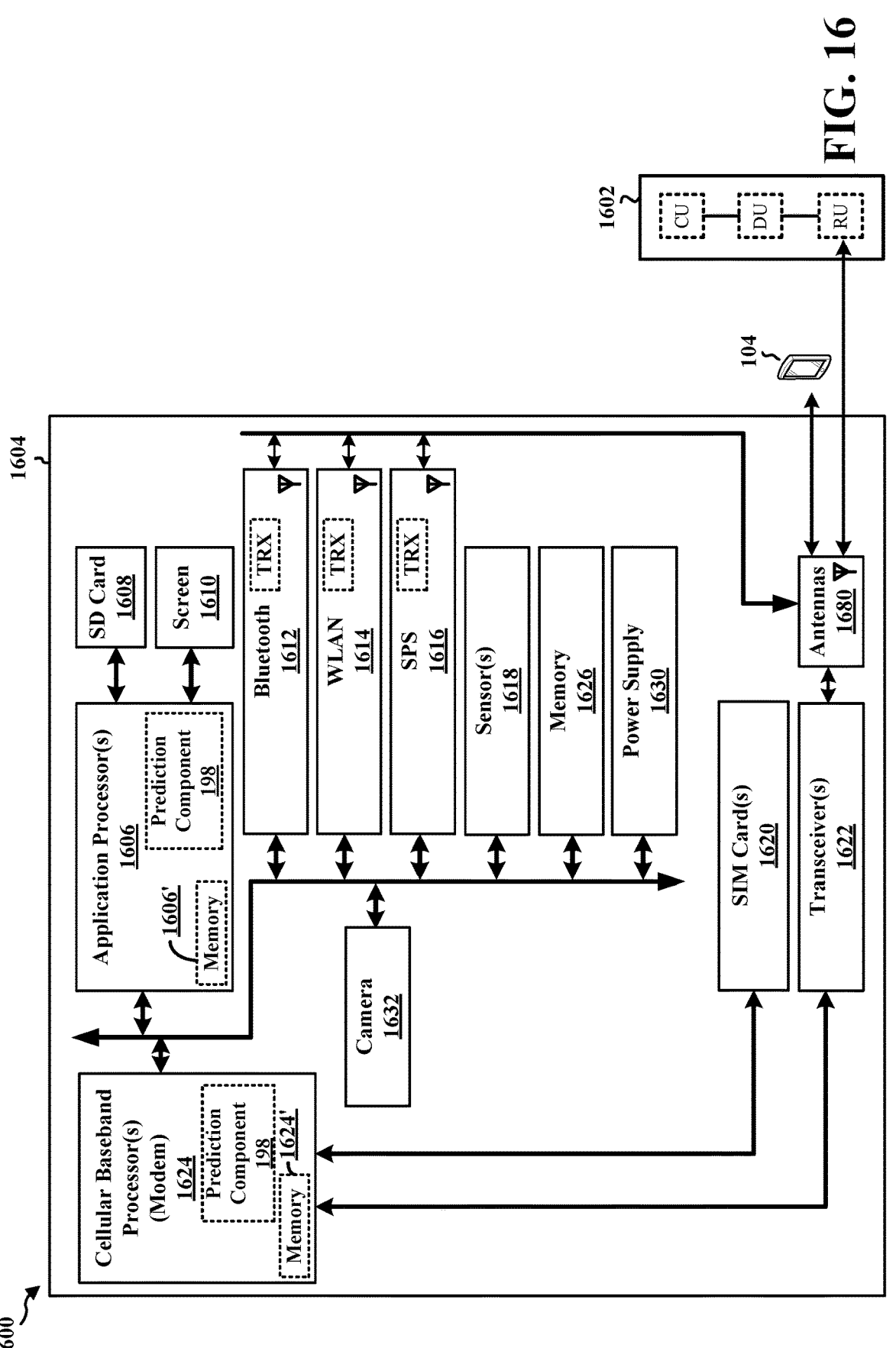
FIG. 16 is a diagram illustrating an example of a hardware implementation for an example apparatus and/or network entity.

FIG. 16 is a diagram 1600 illustrating an example of a hardware implementation for an apparatus 1604. The apparatus 1604 may be a UE, a component of a UE, or may implement UE functionality. In some aspects, the apparatus 1604 may include at least one cellular baseband processor 1624 (also referred to as a modem) coupled to one or more transceivers 1622 (e.g., cellular RF transceiver). The cellular baseband processor(s) 1624 may include at least one on-chip memory 1624'. In some aspects, the apparatus 1604 may further include one or more subscriber identity modules (SIM) cards 1620 and at least one application processor 1606 coupled to a secure digital (SD) card 1608 and a screen 1610. The application processor(s) 1606 may include on-chip memory 1606'. In some aspects, the apparatus 1604 may further include a Bluetooth module 1612, a WLAN module 1614, an SPS module 1616 (e.g., GNSS module), one or more sensor modules 1618 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1626, a power supply 1630, and/or a camera 1632. The Bluetooth module 1612, the WLAN module 1614, and the SPS module 1616 may include an on-chip transceiver (TRX) (or in some cases, just a receiver (RX)). The Bluetooth module 1612, the WLAN module 1614, and the SPS module 1616 may include their own dedicated antennas and/or utilize the antennas 1680 for communication. The cellular baseband processor(s) 1624 communicates through the transceiver(s) 1622 via one or more antennas 1680 with the UE 104 and/or with an RU associated with a network entity 1602. The cellular baseband processor(s) 1624 and the application processor(s) 1606 may each include a computer-readable medium/memory 1624', 1606', respectively. The additional memory modules 1626 may also be considered a computer-readable medium/memory. Each computer-readable medium/memory 1624', 1606', 1626 may be non-transitory. The cellular baseband processor(s) 1624 and the application processor(s) 1606 are each responsible for general processing, including the execution of software stored on the computer-readable medium/memory. The software, when executed by the cellular baseband processor(s) 1624/application processor(s) 1606, causes the cellular baseband processor(s) 1624/application processor(s) 1606 to perform the various functions described supra. The cellular baseband processor(s) 1624 and the application processor(s) 1606 are configured to perform the various functions described supra based at least in part of the information stored in the memory. That is, the cellular baseband processor(s) 1624 and the application processor(s) 1606 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1624/application processor(s) 1606 when executing software. The cellular baseband processor(s) 1624/application processor(s) 1606 may be a component of the UE 350 and may include the at least one memory 360 and/or at least one of the TX processor 368, the RX processor 356, and the controller/processor 359. In one configuration, the apparatus 1604 may be at least one processor chip (modem and/or application) and include just the cellular baseband processor(s) 1624 and/or the application processor(s) 1606, and in another configuration, the apparatus 1604 may be the entire UE (e.g., see UE 350 of FIG. 3) and include the additional modules of the apparatus 1604.

As discussed supra, the component 198 may be configured to transform at least part of a first frame associated with a first perspective of a first camera to at least part of a second frame associated with a second perspective of a second camera based on at least one prediction model; transmit, to a second wireless device, a prediction indication of the at least one prediction model used to transform the at least part of the first frame to the at least part of the second frame; and transmit, to the second wireless device, an encoded signal comprising a combined frame comprising a combination of at least the first frame and the second frame. The component 198 may be within the cellular baseband processor(s) 1624, the application processor(s) 1606, or both the cellular baseband processor(s) 1624 and the application processor(s) 1606. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1604 may include a variety of components configured for various functions. In one configuration, the apparatus 1604, and in particular the cellular baseband processor(s) 1624 and/or the application processor(s) 1606, may include means for transforming at least part of a first frame associated with a first perspective of a first camera to at least part of a second frame associated with a second perspective of a second camera based on at least one prediction model. The apparatus includes means for transmitting, to a second wireless device, a prediction indication of the at least one prediction model used to transform the at least part of the first frame to the at least part of the second frame. The apparatus includes means for transmitting, to the second wireless device, an encoded signal comprising a combined frame comprising a combination of at least the first frame and the second frame. The apparatus further includes means for selecting the at least one prediction model based on a prediction quality. The at least one prediction model is selected from a set of prediction models. The apparatus further includes means for providing, to the second camera, a transformed portion of the at least part of the first frame. The transformed portion comprises an overlap region between the first perspective and the second perspective. The means may be the component 198 of the apparatus 1604 configured to perform the functions recited by the means. As described supra, the apparatus 1604 may include the TX processor 368, the RX processor 356, and the controller/ processor 359. As such, in one configuration, the means may be the TX processor 368, the RX processor 356, and/or the controller/processor 359 configured to perform the functions recited by the means.

FIG. 17 is a flowchart 1700 of a method of wireless communication at a second wireless device. The method may be performed by a UE (e.g., the UE 104; the apparatus 1804) or may be performed by a network entity (e.g., the base station 102; the network entity 1802, 1902). One or more of the illustrated operations may be omitted, transposed, or contemporaneous. The method may allow a first wireless device (e.g., transmitter) to indicate a prediction model used such that the first wireless device and a second wireless device (e.g., receiver) are synchronized in relation to the geometry model used.

At 1702, the second wireless device may receive a prediction indication. For example, 1702 may be performed by prediction component 199 of apparatus 1804 or network entity 1802, 1902. The second wireless device may receive the prediction indication from a first wireless device. The prediction indication may indicate at least one prediction model used to transform at least part of a first frame associated with a first perspective of a first camera to at least part of a second frame associated with a second perspective of a second camera. In some aspects, the at least one prediction model predicts the at least part of the second frame may be based on the at least part of the first frame. In some aspects, the prediction indication may comprise one or more parameters associated with the at least one prediction model. In some aspects, the prediction indication may be received when a connection between the first wireless device and the second wireless device is established. In some aspects, the prediction indication may be received within at least one of DCI, RRC signaling, or MAC-CE. In some aspects, the prediction indication may be received in a periodic configuration or an aperiodic configuration.

At 1704, the second wireless device may receive a compressed signal. For example, 1704 may be performed by prediction component 199 of apparatus 1804 or network entity 1802, 1902. The second wireless device may receive the compressed signal from the first wireless device. The compressed signal may be compressed or encoded, by the first wireless device, based on an encoder scheme. An encoded signal, decoded from the compressed signal, may comprise a combined frame comprising a combination of at least the first frame and the second frame. In some aspects, the combined frame may comprise a transformed portion of the at least part of the first frame. The transformed portion may comprise an overlap region between the first perspective and the second perspective. In some aspects, the transformed portion may be transformed based on the at least one prediction model. The second perspective may comprise the transformed portion and at least a second region that extends beyond the first perspective. The first perspective may comprise a first region that extends beyond the overlap region and the second perspective.

At 1706, the second wireless device may decode the combined frame. For example, 1706 may be performed by prediction component 199 of apparatus 1804 or network entity 1802, 1902. The second wireless device may decode the combined frame based on the at least one prediction model.

Figure 18:
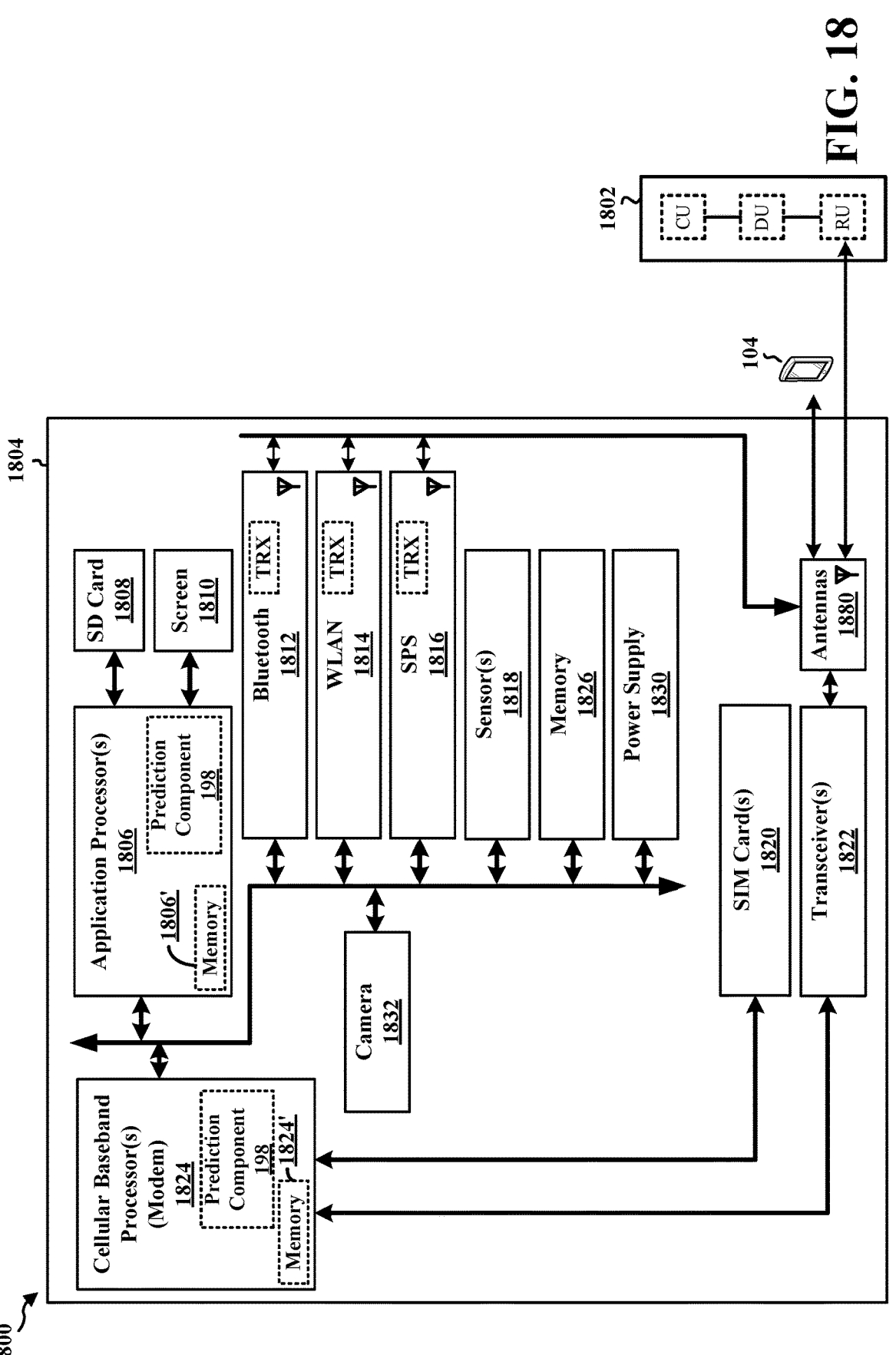
FIG. 18 is a diagram illustrating an example of a hardware implementation for an example apparatus and/or network entity.

FIG. 18 is a diagram 1800 illustrating an example of a hardware implementation for an apparatus 1804. The apparatus 1804 may be a UE, a component of a UE, or may implement UE functionality. In some aspects, the apparatus 1804 may include at least one cellular baseband processor 1824 (also referred to as a modem) coupled to one or more transceivers 1822 (e.g., cellular RF transceiver). The cellular baseband processor(s) 1824 may include at least one on-chip memory 1824'. In some aspects, the apparatus 1804 may further include one or more subscriber identity modules (SIM) cards 1820 and at least one application processor 1806 coupled to a secure digital (SD) card 1808 and a screen 1810. The application processor(s) 1806 may include on-chip memory 1806'. In some aspects, the apparatus 1804 may further include a Bluetooth module 1812, a WLAN module 1814, an SPS module 1816 (e.g., GNSS module), one or more sensor modules 1818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1826, a power supply 1830, and/or a camera 1832. The Bluetooth module 1812, the WLAN module 1814, and the SPS module 1816 may include an on-chip transceiver (TRX) (or in some cases, just a receiver (RX)). The Bluetooth module 1812, the WLAN module 1814, and the SPS module 1816 may include their own dedicated antennas and/or utilize the antennas 1880 for communication. The cellular baseband processor(s) 1824 communicates through the transceiver(s) 1822 via one or more antennas 1880 with the UE 104 and/or with an RU associated with a network entity 1802. The cellular baseband processor(s) 1824 and the application processor(s) 1806 may each include a computer-readable medium/memory 1824', 1806', respectively. The additional memory modules 1826 may also be considered a computer-readable medium/memory. Each computer-readable medium/memory 1824', 1806', 1826 may be non-transitory. The cellular baseband processor(s) 1824 and the application processor(s) 1806 are each responsible for general processing, including the execution of software stored on the computer-readable medium/memory. The software, when executed by the cellular baseband processor(s) 1824/application processor(s) 1806, causes the cellular baseband processor(s) 1824/application processor(s) 1806 to perform the various functions described supra. The cellular baseband processor(s) 1824 and the application processor(s) 1806 are configured to perform the various functions described supra based at least in part of the information stored in the memory. That is, the cellular baseband processor(s) 1824 and the application processor(s) 1806 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1824/application processor(s) 1806 when executing software. The cellular baseband processor (s) 1824/application processor(s) 1806 may be a component of the UE 350 and may include the at least one memory 360 and/or at least one of the TX processor 368, the RX processor 356, and the controller/processor 359. In one configuration, the apparatus 1804 may be at least one processor chip (modem and/or application) and include just the cellular baseband processor(s) 1824 and/or the application processor(s) 1806, and in another configuration, the apparatus 1804 may be the entire UE (e.g., see UE 350 of FIG. 3) and include the additional modules of the apparatus 1804.

Figure 19:
FIG. 19 is a diagram illustrating an example of a hardware implementation for an example network entity.

FIG. 19 is a diagram 1900 illustrating an example of a hardware implementation for a network entity 1902. The network entity 1902 may be a BS, a component of a BS, or may implement BS functionality. The network entity 1902 may include at least one of a CU 1910, a DU 1930, or an RU 1940. For example, depending on the layer functionality handled by the component 199, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include at least one CU processor 1912. The CU processor(s) 1912 may include on-chip memory 1912'. In some aspects, the CU 1910 may further include additional memory modules 1914 and a communications interface 1918. The CU 1910 communicates with the DU 1930 through a midhaul link, such as an F1 interface. The DU 1930 may include at least one DU processor 1932. The DU processor(s) 1932 may include on-chip memory 1932'. In some aspects, the DU 1930 may further include additional memory modules 1934 and a communications interface 1938. The DU 1930 communicates with the RU 1940 through a fronthaul link. The RU 1940 may include at least one RU processor 1942. The RU processor(s) 1942 may include on-chip memory 1942'. In some aspects, the RU 1940 may further include additional memory modules 1944, one or more transceivers 1946, antennas 1980, and a communications interface 1948. The RU 1940 communicates with the UE 104. The on-chip memory 1912', 1932', 1942' and the additional memory modules 1914, 1934, 1944 may each be considered a computer-readable medium/memory. Each computer-readable medium/memory may be non-transitory. Each of the processors 1912, 1932, 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a first wireless device, a prediction indication indicating at least one prediction model used to transform at least part of a first frame associated with a first perspective of a first camera to at least part of a second frame associated with a second perspective of a second camera; receive, from the first wireless device, a compressed signal based on an encoder scheme, wherein an encoded signal comprising a combined frame comprising a combination of at least the first frame and the second frame; and decode the combined frame based on the at least one prediction model. In some aspects, the component 199 may be within the cellular baseband processor(s) 1824, the application processor(s) 1806, or both the cellular baseband processor(s) 1824 and the application processor(s) 1806. In some aspects, the component 199 may be within one or more processors of one or more of the CU 1910, DU 1930, and the RU 1940. The component 199 may be one or more hardware components specifically configured to carry out the stated processes/ algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1804 may include a variety of components configured for various functions. In one configuration, the apparatus 1804, and in particular the cellular baseband processor(s) 1824 and/or the application processor(s) 1806, may include means for receiving, from a first wireless device, a prediction indication indicating at least one prediction model used to transform at least part of a first frame associated with a first perspective of a first camera to at least part of a second frame associated with a second perspective of a second camera. The apparatus includes means for receiving, from the first wireless device, a compressed signal based on an encoder scheme. An encoded signal comprising a combined frame comprising a combination of at least the first frame and the second frame. The apparatus includes means for decoding the combined frame based on the at least one prediction model. The means may be the component 198 of the apparatus 1804 configured to perform the functions recited by the means. As described supra, the apparatus 1804 may include the TX processor 368, the RX processor 356, and the controller/processor 359. As such, in one configuration, the means may be the TX processor 368, the RX processor 356, and/or the controller/ processor 359 configured to perform the functions recited by the means.

The network entity 1902 may include a variety of components configured for various functions. In one configuration, the network entity 1902 may include means for receiving, from a first wireless device, a prediction indication indicating at least one prediction model used to transform at least part of a first frame associated with a first perspective of a first camera to at least part of a second frame associated with a second perspective of a second camera. The network entity includes means for receiving, from the first wireless device, a compressed signal based on an encoder scheme. An encoded signal comprising a combined frame comprising a combination of at least the first frame and the second frame. The network entity includes means for decoding the combined frame based on the at least one prediction model. The means may be the component 199 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device comprising transforming at least part of a first frame associated with a first perspective of a first camera to at least part of a second frame associated with a second perspective of a second camera based on at least one prediction model; transmitting, to a second wireless device, a prediction indication of the at least one prediction model used to transform the at least part of the first frame to the at least part of the second frame; and transmitting, to the second wireless device, an encoded signal comprising a combined frame comprising a combination of at least the first frame and the second frame.

Aspect 2 is the method of aspect 1, further includes that the at least one prediction model predicts the at least part of the second frame based on the at least part of the first frame.

Aspect 3 is the method of any of aspects 1 and 2, further including selecting the at least one prediction model based on a prediction quality, wherein the at least one prediction model is selected from a set of prediction models.

Aspect 4 is the method of any of aspects 1-3, further includes that the prediction indication comprises one or more parameters associated with the at least one prediction model.

Aspect 5 is the method of any of aspects 1-4, further includes that the prediction indication is transmitted when a connection between the first wireless device and the second wireless device is established.

Aspect 6 is the method of any of aspects 1-5, further includes that the prediction indication is transmitted within at least one of DCI, RRC signaling, or MAC-CE.

Aspect 7 is the method of any of aspects 1-6, further includes that the prediction indication is transmitted in a periodic configuration or an aperiodic configuration.

Aspect 8 is the method of any of aspects 1-7, further including providing, to the second camera, a transformed portion of the at least part of the first frame, wherein the transformed portion comprises an overlap region between the first perspective and the second perspective.

Aspect 9 is the method of any of aspects 1-8, further includes that the transformed portion is transformed based on the at least one prediction model, wherein the second perspective comprises the transformed portion and at least a second region that extends beyond the first perspective.

Aspect 10 is the method of any of aspects 1-9, further includes that the first perspective comprises a first region that extends beyond the overlap region and the second perspective.

Aspect 11 is an apparatus for wireless communication at a first wireless device including at least one processor coupled to a memory and at least one transceiver, the at least one processor configured to implement any of aspects 1-10.

Aspect 12 is an apparatus for wireless communication at a first wireless device including means for implementing any of aspects 1-10.

Aspect 13 is a computer-readable medium storing computer executable code, where the code when executed by a processor causes the processor to implement any of aspects 1-10.

Aspect 14 is a method of wireless communication at a second wireless device comprising receiving, from a first wireless device, a prediction indication indicating at least one prediction model used to transform at least part of a first frame associated with a first perspective of a first camera to at least part of a second frame associated with a second perspective of a second camera; receiving, from the first wireless device, a compressed signal based on an encoder scheme, wherein an encoded signal comprising a combined frame comprising a combination of at least the first frame and the second frame; and decoding the combined frame based on the at least one prediction model.

Aspect 15 is the method of aspect 14, further includes that the at least one prediction model predicts the at least part of the second frame based on the at least part of the first frame.

Aspect 16 is the method of any of aspects 14 and 15, further includes that the prediction indication comprises one or more parameters associated with the at least one prediction model.

Aspect 17 is the method of any of aspects 14-16, further includes that the prediction indication is received when a connection between the first wireless device and the second wireless device is established.

Aspect 18 is the method of any of aspects 14-17, further includes that the prediction indication is received within at least one of DCI, RRC signaling, or MAC-CE.

Aspect 19 is the method of any of aspects 14-18, further includes that the prediction indication is received in a periodic configuration or an aperiodic configuration.

Aspect 20 is the method of any of aspects 14-19, further includes that the combined frame comprises a transformed portion of the at least part of the first frame, wherein the transformed portion comprises an overlap region between the first perspective and the second perspective.

Aspect 21 is the method of any of aspects 14-20, further includes that the transformed portion is transformed based on the at least one prediction model, wherein the second perspective comprises the transformed portion and at least a second region that extends beyond the first perspective.

Aspect 22 is the method of any of aspects 14-21, further includes that the first perspective comprises a first region that extends beyond the overlap region and the second perspective.

Aspect 23 is an apparatus for wireless communication at a second wireless device including at least one processor coupled to a memory and at least one transceiver, the at least one processor configured to implement any of aspects 14-22.

Aspect 24 is an apparatus for wireless communication at a second wireless device including means for implementing any of aspects 14-22.

Aspect 25 is a computer-readable medium storing computer executable code, where the code when executed by a processor causes the processor to implement any of aspects 14-22.

What is claimed is:

1. An apparatus for wireless communication at a first wireless device, comprising:
at least one memory; and
at least one processor coupled to the at least one memory and, based at least in part on information stored in the at least one memory, the at least one processor, individually or in any combination, is configured to cause the apparatus to:
transform at least part of a first frame associated with a first perspective of a first camera to at least part of a second frame associated with a second perspective of a second camera based on at least one prediction model;
transmit, to a second wireless device, a prediction indication of the at least one prediction model used to transform the at least part of the first frame to the at least part of the second frame; and
transmit, to the second wireless device, an encoded signal comprising a combined frame comprising a combination of at least the first frame and the second frame.

2. The apparatus of claim 1, further comprising a transceiver coupled to the at least one processor, the transceiver being configured to:
transmit, to the second wireless device, the prediction indication of the at least one prediction model used to transform the at least part of the first frame to the at least part of the second frame; and
transmit, to the second wireless device, the encoded signal comprising the combined frame comprising the combination of the at least the first frame and the second frame.

3. The apparatus of claim 1, wherein the at least one prediction model predicts the at least part of the second frame based on the at least part of the first frame.

4. The apparatus of claim 1, wherein the at least one processor is configured to:
select the at least one prediction model based on a prediction quality, wherein the at least one prediction model is selected from a set of prediction models.

5. The apparatus of claim 1, wherein the prediction indication comprises one or more parameters associated with the at least one prediction model.

6. The apparatus of claim 1, wherein the prediction indication is transmitted when a connection between the first wireless device and the second wireless device is established.

7. The apparatus of claim 1, wherein the prediction indication is transmitted within at least one of a downlink control indicator (DCI), radio resource control (RRC) signaling, or media access control (MAC) control element (CE) (MAC-CE).

8. The apparatus of claim 1, wherein the prediction indication is transmitted in a periodic configuration or an aperiodic configuration.

9. The apparatus of claim 1, wherein the at least one processor is configured to:
provide, to the second camera, a transformed portion of the at least part of the first frame, wherein the transformed portion comprises an overlap region between the first perspective and the second perspective.

10. The apparatus of claim 9, wherein the transformed portion is transformed based on the at least one prediction model, wherein the second perspective comprises the transformed portion and at least a second region that extends beyond the first perspective.

11. The apparatus of claim 10, wherein the first perspective comprises a first region that extends beyond the overlap region and the second perspective.

12. A method of wireless communication at a first wireless device, comprising:
transforming at least part of a first frame associated with a first perspective of a first camera to at least part of a second frame associated with a second perspective of a second camera based on at least one prediction model;
transmitting, to a second wireless device, a prediction indication of the at least one prediction model used to transform the at least part of the first frame to the at least part of the second frame; and transmitting, to the second wireless device, an encoded signal comprising a combined frame comprising a combination of at least the first frame and the second frame.

13. The method of claim 12, wherein the at least one prediction model predicts the at least part of the second frame based on the at least part of the first frame.

14. The method of claim 12, further comprising:

selecting the at least one prediction model based on a prediction quality, wherein the at least one prediction model is selected from a set of prediction models.

15. The method of claim 12, further comprising:

providing, to the second camera, a transformed portion of the at least part of the first frame, wherein the transformed portion comprises an overlap region between the first perspective and the second perspective.

16. The method of claim 15, wherein the transformed portion is transformed based on the at least one prediction model, wherein the second perspective comprises the transformed portion and at least a second region that extends beyond the first perspective, wherein the first perspective comprises a first region that extends beyond the overlap region and the second perspective.

17. An apparatus for wireless communication at a second wireless device, comprising:

at least one memory; and at least one processor coupled to the at least one memory and, based at least in part on information stored in the at least one memory, the at least one processor, individually or in any combination, is configured to cause the apparatus to:

receive, from a first wireless device, a prediction indication indicating at least one prediction model used to transform at least part of a first frame associated with a first perspective of a first camera to at least part of a second frame associated with a second perspective of a second camera;

receive, from the first wireless device, a compressed signal based on an encoder scheme, wherein an encoded signal comprising a combined frame comprising a combination of at least the first frame and the second frame; and decode the combined frame based on the at least one prediction model.

18. The apparatus of claim 17, further comprising a transceiver coupled to the at least one processor, the transceiver being configured to:

receive, from the first wireless device, the prediction indication indicating the at least one prediction model used to transform the at least part of the first frame associated with the first perspective of the first camera to the at least part of the second frame associated with the second perspective of the second camera; and receive, from the first wireless device, the compressed signal based on the encoder scheme, wherein the encoded signal comprising the combined frame comprising the combination of the at least the first frame and the second frame.

19. The apparatus of claim 17, wherein the at least one prediction model predicts the at least part of the second frame based on the at least part of the first frame.

20. The apparatus of claim 17, wherein the prediction indication comprises one or more parameters associated with the at least one prediction model.

21. The apparatus of claim 17, wherein the prediction indication is received when a connection between the first wireless device and the second wireless device is established.

22. The apparatus of claim 17, wherein the prediction indication is received within at least one of a downlink control indicator (DCI), radio resource control (RRC) signaling, or media access control (MAC) control element (CE) (MAC-CE).

23. The apparatus of claim 17, wherein the prediction indication is received in a periodic configuration or an aperiodic configuration.

24. The apparatus of claim 17, wherein the combined frame comprises a transformed portion of the at least part of the first frame, wherein the transformed portion comprises an overlap region between the first perspective and the second perspective.

25. The apparatus of claim 24, wherein the transformed portion is transformed based on the at least one prediction model, wherein the second perspective comprises the transformed portion and at least a second region that extends beyond the first perspective.

26. The apparatus of claim 25, wherein the first perspective comprises a first region that extends beyond the overlap region and the second perspective.

27. A method of wireless communication at a second wireless device, comprising:

receiving, from a first wireless device, a prediction indication indicating at least one prediction model used to transform at least part of a first frame associated with a first perspective of a first camera to at least part of a second frame associated with a second perspective of a second camera;

receiving, from the first wireless device, a compressed signal based on an encoder scheme, wherein an encoded signal comprising a combined frame comprising a combination of at least the first frame and the second frame; and decoding the combined frame based on the at least one prediction model.

28. The method of claim 27, wherein the at least one prediction model predicts the at least part of the second frame based on the at least part of the first frame.

29. The method of claim 27, wherein the combined frame comprises a transformed portion of the at least part of the first frame, wherein the transformed portion comprises an overlap region between the first perspective and the second perspective.

30. The method of claim 29, wherein the transformed portion is transformed based on the at least one prediction model, wherein the second perspective comprises the transformed portion and at least a second region that extends beyond the first perspective, wherein the first perspective comprises a first region that extends beyond the overlap region and the second perspective.

* * * * *